US010494038B2

(12) United States Patent
Irie et al.

(10) Patent No.: US 10,494,038 B2
(45) Date of Patent: Dec. 3, 2019

(54) UPPER SLEWING BODY

(71) Applicants: Kobe Steel, Ltd., Kobe-shi (JP); KOBELCO CONSTRUCTION MACHINERY CO., LTD., Hiroshima-shi (JP)

(72) Inventors: Masashi Irie, Kobe (JP); Takahiro Shinozaki, Kobe (JP); Yoshimune Mori, Kobe (JP); Masashi Kawabata, Kobe (JP); Kiyotsuna Kuchiki, Hyogo (JP); Tomonori Nakashita, Hyogo (JP); Masaya Nishizawa, Hyogo (JP); Yasumasa Kimura, Hyogo (JP); Eri Watanabe, Hyogo (JP)

(73) Assignees: Kobe Steel, Ltd., Kobe-shi (JP); KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 222 days.

(21) Appl. No.: 15/571,363

(22) PCT Filed: May 12, 2016

(86) PCT No.: PCT/JP2016/064195
§ 371 (c)(1),
(2) Date: Nov. 2, 2017

(87) PCT Pub. No.: WO2016/182033
PCT Pub. Date: Nov. 17, 2016

(65) Prior Publication Data
US 2019/0152532 A1   May 23, 2019

(30) Foreign Application Priority Data

May 13, 2015 (JP) .................... 2015-098547
Jul. 24, 2015 (JP) .................... 2015-146883

(51) Int. Cl.
B62D 33/06 (2006.01)
E02F 9/08 (2006.01)
(Continued)

(52) U.S. Cl.
CPC ......... B62D 33/0604 (2013.01); B62D 21/18 (2013.01); B66C 13/54 (2013.01);
(Continued)

(58) Field of Classification Search
CPC .......... B62D 33/0604; E02F 9/16; E02F 9/08
See application file for complete search history.

(56) References Cited

U.S. PATENT DOCUMENTS 8,235,156 B2 * 8/2012 Koss ............... E02F 9/163
                                              180/311
8,312,955 B2   11/2012 Kawashiri
(Continued)

FOREIGN PATENT DOCUMENTS

CN    103534417 A      1/2014
JP    2003020681 A  *  1/2003
(Continued)

OTHER PUBLICATIONS

International Search Report dated Aug. 16, 2016, in PCT/JP2016/064195 filed May 12, 2016.
(Continued)

Primary Examiner — Nicole T Verley
(74) Attorney, Agent, or Firm — Oblon, McClelland, Maier & Neustadt, L.L.P.

(57) ABSTRACT

The vibration of a cab deck as well as the mass of a deck supporting member is suppressed. A slewing frame of an upper slewing body includes a front plate connected to a second side plate. A cab deck is disposed on a front side of an engine deck with a gap between the cab deck and the engine deck. A deck supporting member is connected to the
(Continued)

second side plate and the cab deck. When viewed along an up-and-down direction, a connection portion of the front plate to be connected to the second side plate is opposed to, in the lateral direction via the second side plate, a connection portion of the deck supporting member to be connected to the second side plate.

9 Claims, 18 Drawing Sheets

(51) Int. Cl.
    *B62D 21/18*     (2006.01)
    *B66C 23/36*     (2006.01)
    *B66C 13/54*     (2006.01)
    *E02F 9/16*     (2006.01)

(52) U.S. Cl.
    CPC ............... *B66C 23/36* (2013.01); *E02F 9/08* (2013.01); *E02F 9/0808* (2013.01); *E02F 9/0866* (2013.01); *E02F 9/16* (2013.01)

(56) References Cited

U.S. PATENT DOCUMENTS

| | | | | |
|---|---|---|---|---|
| 8,517,457 B2 * | 8/2013 | Yamamoto | ......... | B62D 33/0604 296/190.07 |
| 9,745,717 B2 * | 8/2017 | Sakata | ................. | E02F 9/0808 |
| 2012/0187721 A1 * | 7/2012 | Nishimura | ................ | E02F 9/16 296/190.03 |
| 2013/0323001 A1 | 12/2013 | Ueki et al. | | |

FOREIGN PATENT DOCUMENTS

| | | | | | |
|---|---|---|---|---|---|
| JP | 2004-239015 | A | | 8/2004 | |
| JP | 2010-64818 | A | | 3/2010 | |
| JP | 2011256662 | A | * | 12/2011 | |
| JP | 2012-82595 | A | | 4/2012 | |
| JP | 5214387 | B2 | * | 6/2013 | |
| JP | 5307760 | B2 | * | 10/2013 | |
| JP | 2013241817 | A | * | 12/2013 | |
| JP | 5666234 | B2 | * | 2/2015 | |
| JP | 2018024503 | A | * | 2/2018 | |
| WO | WO-2007010808 | A1 | * | 1/2007 | ......... B62D 33/0617 |
| WO | WO-2016066179 | A1 | * | 5/2016 | ........... B62D 33/077 |

OTHER PUBLICATIONS

Combined Chinese Office Action and Search Report dated Mar. 11, 2019 in Patent Application No. 201680027771.7 (with unedited computer generated English translation of Office Action and English translation of category of cited documents) 17 pages.

* cited by examiner

UPPER SLEWING BODY

TECHNICAL FIELD

The present invention relates to an upper slewing body.

BACKGROUND ART

A conventional upper slewing body is disclosed in, for example, Patent Literature 1. FIG. 6 of Patent Literature 1 discloses an upper slewing body, which includes a slewing frame and a deck connected to the slewing frame. The deck supports components, such as a cab (operator room), at a lower side thereof. The deck and the slewing frame are interconnected through a deck supporting member.

CITATION LIST

Patent Literature

Patent Literature 1: JP 2010-64818 A

SUMMARY OF INVENTION

Problems to be Solved by the Invention

There are some cases where not only a cab but a vibrating source such as an engine is mounted on a deck of an upper slewing body. In such a case, vibration of the vibrating source can be transmitted via the deck to the cab to thereby cause vibration and noise in the cab.

To suppress transmission of vibration from the vibrating source to the cab, can be considered separating the deck to support the vibrating source from the deck (cab deck) to support the cab. In such a structure, the vibration mode in which the cab deck is deformed laterally while deformed vertically is dominant among vibration modes. This results in a large vibration of the cab supported on the cab deck, which may deteriorate ride quality in the cab.

It is also considered to increase the size of the deck supporting member interconnecting the deck and the slewing frame in order to suppress vibration of the cab deck in the vibration mode described above. However, increasing the size of the deck supporting member leads to the increase in a mass of the deck supporting member. This increases the mass of the upper slewing body, raising the cost of the upper slewing body.

An object of the present invention is to provide an upper slewing body including a cab deck capable of being restrained from vibration and a deck support member having a reduced mass.

Solution to Problem

An upper slewing body according to the present invention includes a slewing frame, an engine deck, a cab deck, and a deck supporting member. The slewing frame includes a first side plate and a second side plate laterally opposed to each other. The engine deck is disposed at a laterally outer side of the slewing frame and is fixed to the slewing frame. The cab deck is disposed on a front side of the engine deck with a gap between the cab deck and the engine deck. The deck supporting member is connected to the second side plate and the cab deck. The slewing frame includes a side-plate supporting member connected to the second side plate. The side-plate supporting member has a connection portion to be connected to the second side plate, the connection portion being laterally opposed to the second side plate via the second side plate when viewed along an up-and-down direction.

Advantageous Effects of Invention

The above configuration allows the cab deck to be restrained from vibration and allows the deck supporting member to have a reduced mass.

DESCRIPTION OF EMBODIMENTS

[First Embodiment]

Figure 1:
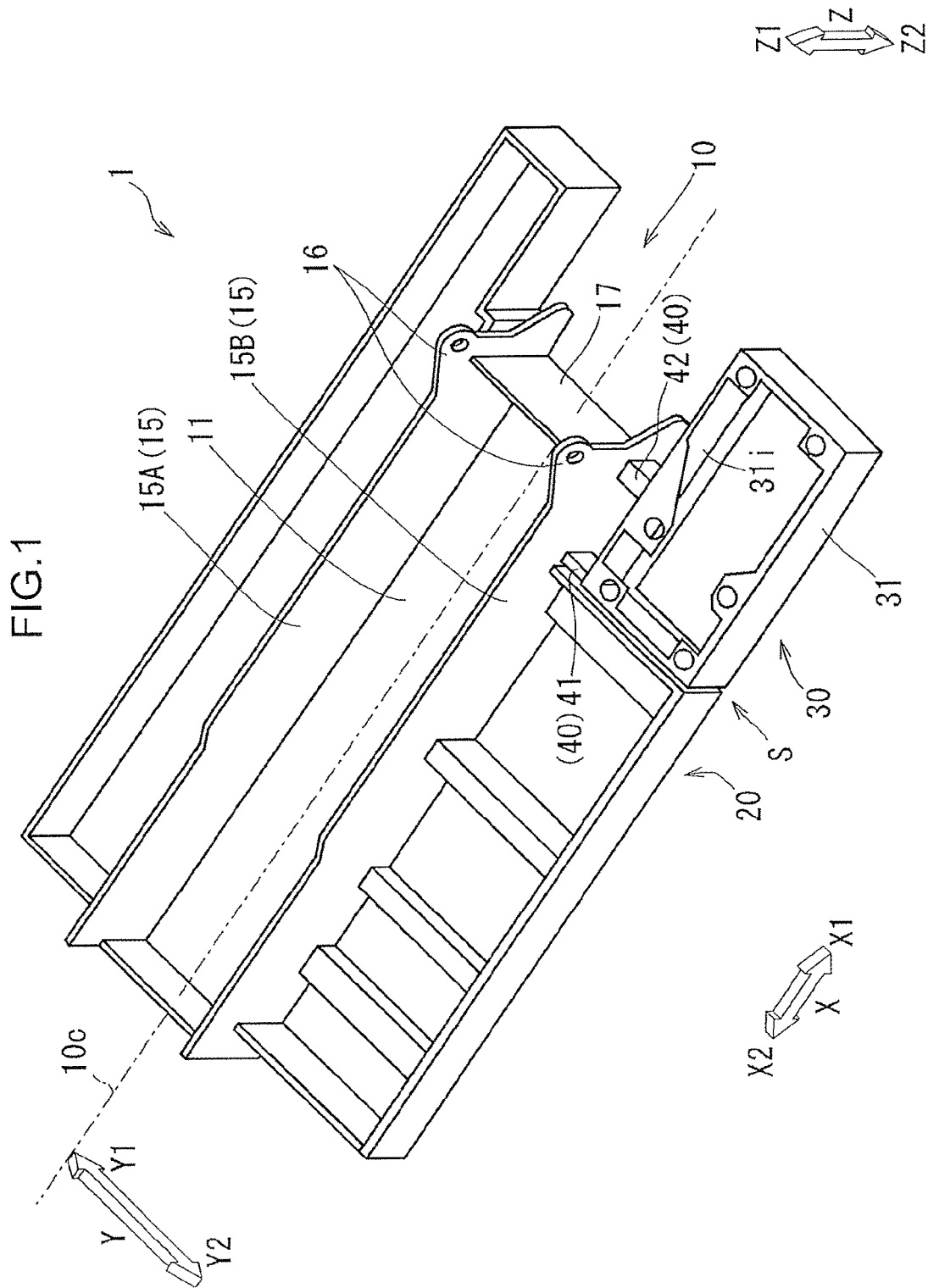
FIG. 1 is a perspective view of an upper slewing body 1.

There will be described an upper slewing body 1 of the embodiment according to the present invention shown in FIG. 1, with reference to FIGS. 1 to 4.

The upper slewing body 1 (a low vibration deck structure, a crane deck support structure, or a crane-cab vibration reducing structure) is used in a construction machine. A construction machine using the upper slewing body 1 is, for example, a crane. Such a crane may be, for example, a travelling crane such as a lattice boom crawler crane. The upper slewing body 1 is mounted on a lower travelling body (not shown) and can be slewed relatively to the lower travelling body. The upper slewing body 1 includes a slewing frame 10, an engine deck 20, a cab deck 30, and a deck supporting member 40.

The slewing frame 10 (central section) is mounted on the lower travelling body (not shown). The central line of the slewing frame 10 extending in the longitudinal direction of the slewing frame 10 is defined as a central line 10c. The longitudinal direction of the slewing frame 10 (direction along the central line 10c) is defined as front-and-rear direction X. Along the front-and-rear direction X, the side (or direction) on which the cab deck 30 exists with respect to the engine deck 20 is defined as front side X1. The side opposite to the front side X1 is defined as rear side X2. The horizontal direction (right and left direction) perpendicular to the longitudinal direction of the slewing frame 10 is defined as lateral direction Y. With respect to the lateral direction Y, the side close to the central line 10c is defined as laterally inner side Y1, and the side remote from the central line 10c is defined as laterally outer side Y2. The direction perpendicular to both the front-and-rear direction X and the lateral direction Y (namely, vertical direction) is defined as up-and-down direction Z. With respect to the up-and-down direction Z, there are upper side Z1 and lower side Z2. The slewing frame 10 includes a bottom plate 11 (a lower plate), a side plate 15, a boom mounting bracket 16, a front plate 17 (a side-plate supporting member), and a slewing frame reinforcement portion 19 (see FIG. 3). There are mounted a boom B (also referred to as a jib, see FIG. 3) and a gantry (not shown) on the slewing frame 10.

The bottom plate 11 is a plate-like structure (a plate-like member, or a plate) configuring the bottom part (a lower-side-Z2 part) of the slewing frame 10. The "plate-like" may be construed as substantially plate-like (hereinafter, construed in the same meaning). The bottom plate 11 extends in both the front-and-rear direction X and the lateral direction Y.

The side plate 15 (a vertical plate) is a plate-like structure configuring a laterally-outer-side-Y2 part (side surface) of the slewing frame 10. The side plate 15 extends in the up-and-down direction Z and the front-and-rear direction X. The side plate 15 has a thickness in the lateral direction Y. A plurality of side plates 15 are provided. For example, two (or more) side plates 15 are provided. The side plate 15 protrudes (extends) to the upper side Z1 beyond the bottom plate 11. More specifically, the side plates 15 protrude in the upper side Z1 from opposite end parts in the laterally outer sides Y2 of the bottom plate 11. The "end part" means an end and a region in the vicinity of the end (hereinafter, used in the same meaning). The side plates 15 include a first side plate 15A and a second side plate 15B. The first side plate 15A and the second side plate 15B (a plurality of side plates 15) are opposed to each other in the lateral direction Y. The second side plate 15B is disposed on a side closer to the cab deck 30 than the first side plate 15A.

Figure 3:
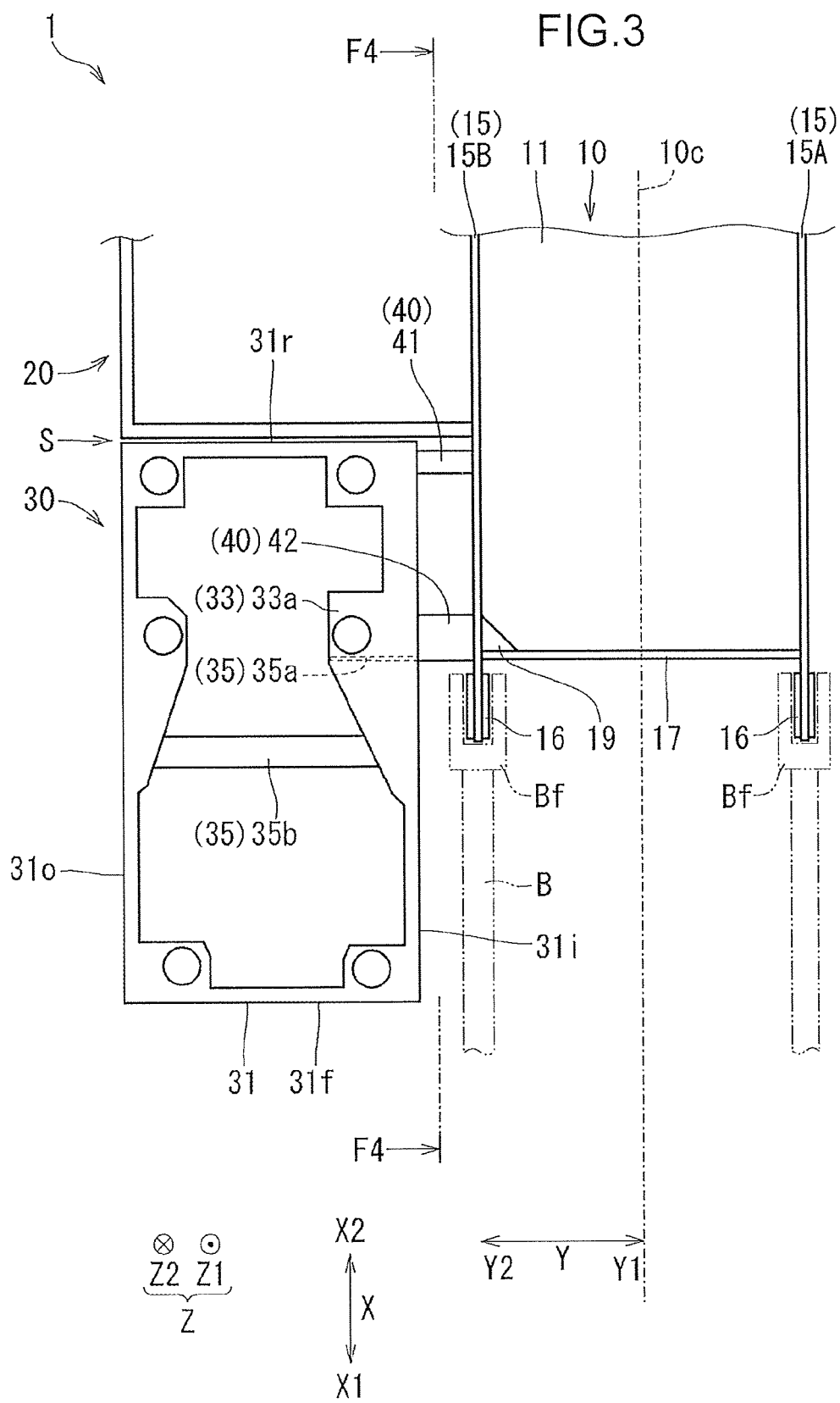
FIG. 3 shows a deck supporting member 40 and a vicinity thereof shown in FIG. 1 viewed from above.

As shown in FIG. 3, a boom foot Bf, which is the proximal end of the boom B (specifically, a lower part of the boom), is mounted on the boom mounting bracket 16. The boom B is a structure for hoisting a suspended load with a wire rope to move the suspended load. The boom mounting bracket 16 is provided on an upper-side-Z1 end of a front-side-X1 end of the side plate 15.

The front plate 17 (side-plate supporting member) is a plate-like structure configuring a front-side-X1 part of the slewing frame 10. The front plate 17 interconnects a plurality of side plates 15, being connected to the first side plate 15A and the second side plate 15B. More specifically, with respect to the lateral direction Y, one end of the front plate 17 is fixed to the first side plate 15A while the other end of the front plate 17 is fixed to the second side plate 15B. The front plate 17 has a thickness in the front-and-rear direction X (or approximately in the front-and-rear direction X). The front plate 17 extends (protrudes) along the lateral direction Y in the upper side Z1 beyond the bottom plate 11. The front plate 17 has a lower-side-Z2 end which is fixed to the top surface of the bottom plate 11 (end surface facing the upper side Z1). The front plate 17 is fixed to a part near the front-side-X1 end in the side plate 15.

Figure 4:
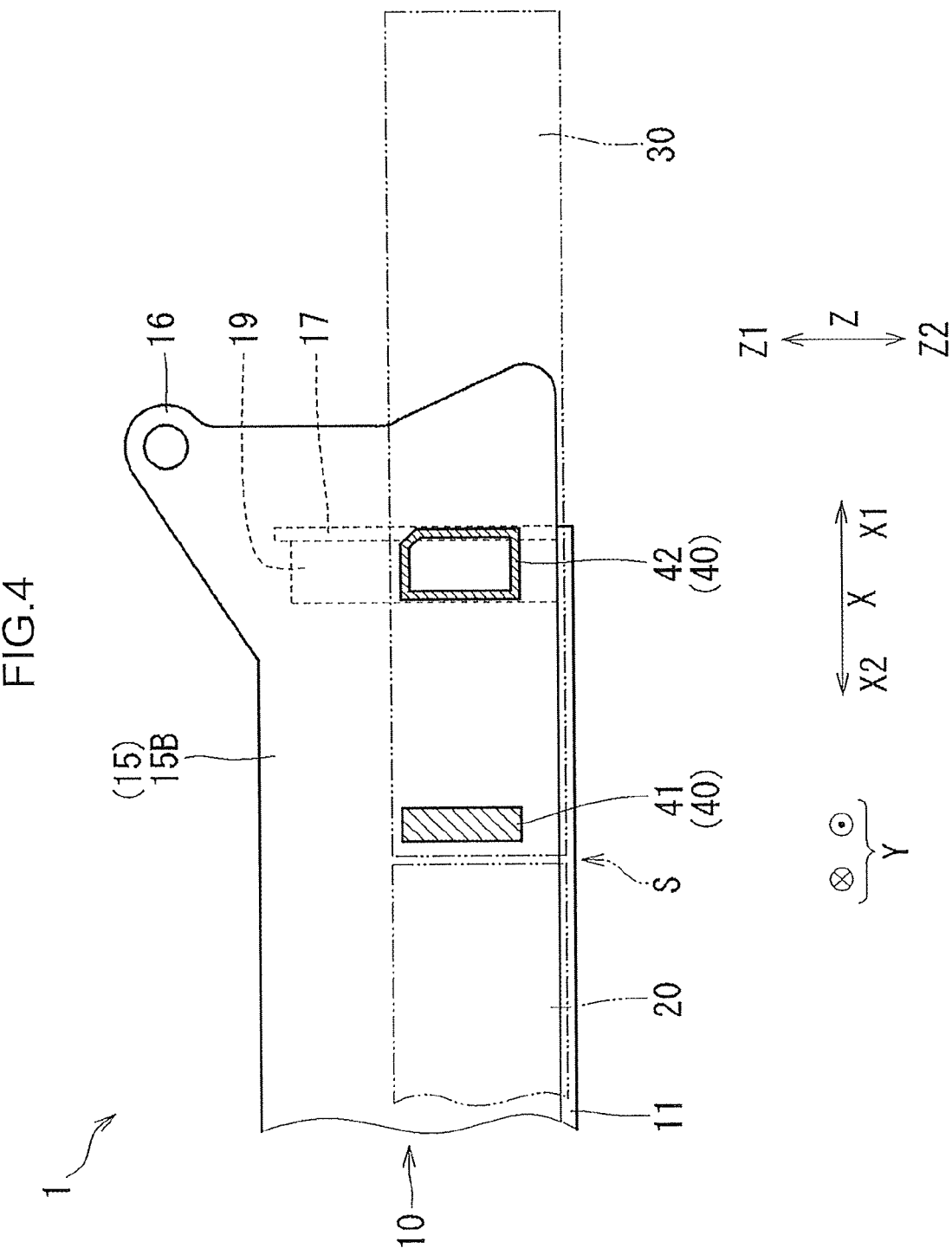
FIG. 4 is a sectional view taken along line F4-F4 in FIG. 3.

The slewing frame reinforcement portion 19 is connected (joined, fixed) to the front plate 17 and the second side plate 15B to reinforce the joint between the front plate 17 and the second side plate 15B. The slewing frame reinforcement portion 19 has a form of, for example, a combined plate-like members (ribs), permitted to have a hollow or a solid structure. The slewing frame reinforcement portion 19 has a form of, for example, a triangular pillar that has a triangular shape when viewed along the up-and-down direction Z and is long in the up-and-down direction Z as shown in FIG. 4.

As shown in FIG. 1, the engine deck 20 is a structure (a frame or a deck member) on which a vibration source such as an engine (not shown) is mounted. On the engine deck 20, there may be mounted a vibration source other than an engine (for example, a hydraulic pump, which is not shown). For example, a radiator, a fan, an exhaust gas purifying device, and an engine guard for protecting devices (none are shown) may be mounted on the engine deck 20. The engine deck 20 is disposed on the laterally outer side Y2 of the slewing frame 10 and is fixed (connected) to the slewing frame 10, specifically, the second side plate 15B.

The cab deck 30 is a structure (a frame or a deck member) on which a cab (an operator room which is not shown) is mounted. The cab deck 30 is disposed on the laterally outer side Y2 of the slewing frame 10 and is fixed to the slewing frame 10, specifically, to the second side plate 15B. The cab deck 30 is disposed so as to be opposed to the engine deck 20 in the front-and-rear direction X, on the front side X1 of the engine deck 20. The cab deck 30 is not directly connected to (that is, separated from) the engine deck 20. The cab deck 30 is disposed with a gap S (gap S in the front-and-rear direction X) between the cab deck 30 and the engine deck 20. The gap S is provided to prevent vibration of the engine deck 20 from being directly transmitted to the cab deck 30. There is also provided a gap in the front-and-rear direction X between the cab mounted on the cab deck 30 and the engine guard mounted on the engine deck 20. The cab deck 30 includes a frame portion 31, a cab mount 33 shown in FIG. 2, and a cab deck reinforcement portion 35.

The frame portion 31 configures the outer peripheral part (an outer peripheral part in a view in the up-and-down direction Z) of the cab deck 30. The frame portion 31 has a rectangular shape (including a substantially rectangular shape) when viewed along the up-and-down direction Z and is long in the front-and-rear direction X. The frame portion 31 is formed of, for example, plate-like members extending in the up-and-down direction Z. The frame portion 31 includes a plate 31f forming a front-side-X1 part of the frame portion 31, a plate 31r forming a rear-side-X2 part of the frame portion 31, and an outer frame portion 31o forming a laterally-outer-side-Y2 part of the frame portion 31 (a side plate of the frame portion 31). The frame portion 31 further includes an inner frame portion 31i forming a laterally-inner-side-Y1 part of the frame portion 31 (a side plate of the frame portion 31). The inner frame portion 31i is a plate extending in the front-and-rear direction X and the up-and-down direction Z. The inner frame portion 31i has a thickness in the lateral direction Y. The inner frame portion 31i and the second side plate 159 are opposed to each other in the lateral direction Y.

The cab mount 33 is a portion on which the cab (not shown) is mounted (a portion for mounting a cab). The cab mount 33 is fixed to the frame portion 31 and may be provided, for example, as a portion integrated with the frame portion 31 or a portion independent from the frame portion 31. The cab mount 33 extends in the lateral direction Y from the upper-side-Z1 end of the frame portion 31. The cab mount 33 protrudes inward beyond the frame portion 31 (into the region surrounded by the frame portion 31) when viewed along the up-and-down direction Z. The cab mounts 33 may be provided, for example, on six locations (or five or below or seven or more locations) on the frame portion 31. Among a plurality of cab mounts 33, the cab mount 33 provided between the front-side-X1 end and the rear-side-X2 end of the inner frame portion 31i is defined as a cab mount 33a.

Figure 2:
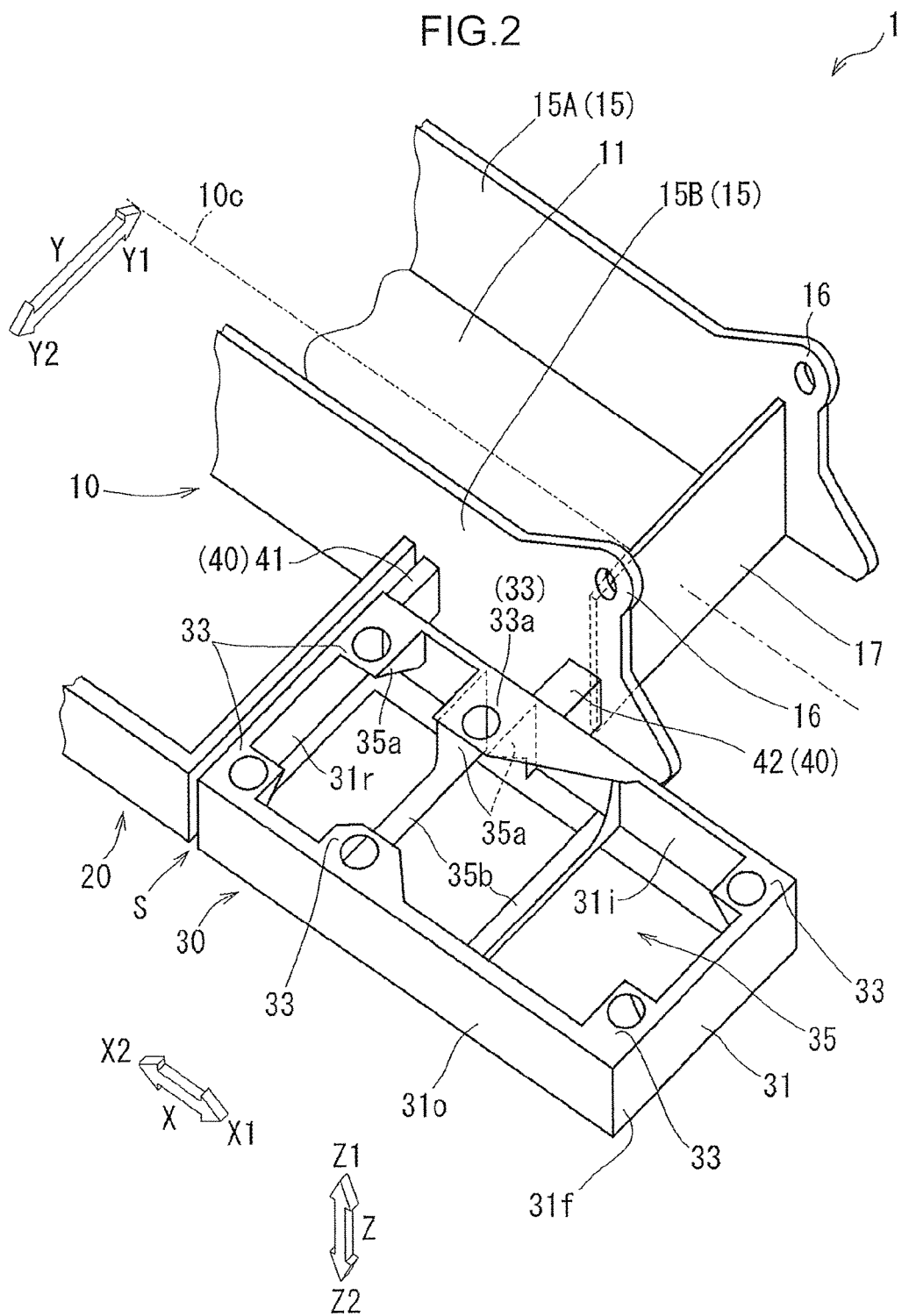
FIG. 2 is an enlarged view showing a deck supporting member 40 and a vicinity thereof shown in FIG. 1.

The cab deck reinforcement portion 35 is a portion that reinforces the cab deck 30, being fixed to the frame portion 31. The cab deck reinforcement portions 35 includes, for example, a cab mount reinforcement portion 35a and a beam 35b. The cab mount reinforcement portion 35a, which is a portion to reinforce the joint between the cab mount 33 and the frame portion 31, is connected (joined, fixed) to the frame portion 31 and the cab mount 33. In FIG. 2, reference signs are given only to some of a plurality of cab mount reinforcement portions 35a. The cab mount reinforcement portion 35a is, for example, a plate-like member (rib), disposed perpendicularly to the frame portion 31 and the cab mount 33. The beam 35b, which is a portion to reinforce the frame portion 31, extends in the lateral direction Y and is connected (joined, fixed) to the outer frame portion 310 and the inner frame portion 31i. The beam 35b is a bar-like or a plate-like member disposed perpendicular to the frame portion 31. For example, a plurality of beams 35b is provided. FIG. 2 shows two beams 35b, but three or more beams 35b or only one beam 35b may be provided. The beam 35b may be integrated with the cab mount reinforcement portion 35a. In the frame portion 31, a part to which the cab deck reinforcement portion 35 is fixed has a high rigidity (is a high rigidity part) compared to other parts to which no cab deck reinforcement portion 35 is fixed. The cab deck reinforcement portion 35 do not have to be a plate-like shape or a bar-like shape but may have, for example, a block shape (a rectangular parallelepiped and the like).

The deck supporting member 40 (a supporting beam or a connecting beam) is a member (for example, a beam) supporting the cab deck 30 and the cab (not shown) on the slewing frame 10. The deck supporting member 40 bears the mass of the cab deck 30 and the cab. The deck supporting member 40 is disposed between the slewing frame 10 and the cab deck 30. The deck supporting member 40 is connected (joined, fixed) to the slewing frame 10 and the cab deck 30, more specifically, to the second side plate 15B and the frame portion 31 (inner frame portion 31i). As shown in FIG. 3, the deck supporting member 40 is provided to avoid interference between the cab (not shown) mounted on the cab deck 30 and the boom B. More specifically, the boom foot Bf is provided so as to hold the boom mounting bracket 16 at both sides thereof in the lateral direction Y. This requires a gap in the lateral direction Y between the boom mounting bracket 16 and the cab. This requires a gap in the lateral direction Y between the slewing frame 10 and the cab deck 30, more specifically, a gap in the lateral direction Y between the second side plate 15B and the inner frame portion 31i to be provided. The deck supporting member 40 is provided to create such a gap. The deck supporting member 40 is constituted by a plurality of (specifically, two) unit deck supporting members. Each of the plurality of unit deck supporting members is a member connected to the slewing frame 10 and the cab deck 30. The unit deck supporting members constituting the deck supporting member 40A include a rear deck supporting member 41 and a front deck supporting member 42.

The rear deck supporting member 41 (first supporting beam) is fixed to the rear-side-X2 end (or a vicinity thereof) of the inner frame portion 31i. The rear deck supporting member 41 is a substantially bar-like member (beam) extending in the lateral direction Y (horizontal direction) (the same can be said for the front deck supporting member 42). As shown in FIG. 4, the rear deck supporting member 41 may have a solid structure, or a hollow structure (the same can be said for the front deck supporting member 42). The rear deck supporting member 41 has a cross section perpendicular to the lateral direction Y, the cross section having, for example, a polygonal shape such as a rectangle or a substantial rectangle. The shape of the cross sectional shape of the rear deck supporting member 41 (more specifically, the outer peripheral shape of the cross section) does not have to be a polygonal shape but may be a substantially polygonal shape such as a C-shape, a circle, or one similar to a C-shape or a substantial circle (the same can be said for the front deck supporting member 42).

The front deck supporting member 42 (second supporting beam) is disposed on the front side X1 of the rear deck supporting member 41. The cross section perpendicular to the lateral direction Y of the front deck supporting member 42 has, for example, a polygonal shape such as a rectangle or a substantial rectangle and a pentagon.

The front deck supporting member 42 is disposed so as to be restrained from deformation at a fixed portion (a connection portion, namely, a root) of the front deck supporting member 42, the fixed portion being fixed to the stewing frame 10 (second side plate 15B) shown in FIG. 3. Specifically, as shown in FIG. 4, (at least a part of) the front deck supporting member 42 is disposed so as to overlap (at least a part of) the front plate 17 when viewed along the lateral direction Y. In other words, the front deck supporting member 42 and the front plate 17 are disposed on the same straight line extending in the lateral direction Y.

The front deck supporting member 42 is opposed to the front plate 17 in the lateral direction Y via the second side plate 15B. As shown in FIG. 3, at least when viewed along the up-and-down direction Z, a connection portion (fixed portion) of the front deck supporting member 42, the connection portion being a portion connected to the second side plate 15B, is opposed, in the lateral direction Y via the second side plate 15B, a connection portion of the front plate 17 to be connected to the second side plate 15B. Preferably, also when viewed along the front-and-rear direction X, the connection portion of the front deck supporting member 42 to be connected to the second side plate 15B is opposed, in the lateral direction Y via the second side plate 15B, to the connection portion of the front plate 17 to be connected to the second side plate 15B. Preferably, also when viewed along the lateral direction Y, the connection portion of the front deck supporting member 42 to be connected to the second side plate 15B overlaps the connection portion of the front plate 17 to be connected to the second side plate 15B.

Specifically, the front deck supporting member 42 is disposed, for example, as follows. The front-and-rear-direction-X location (the location with respect to the front-and-rear direction X) of the front-side-X1 end of the front deck supporting member 42 is identical (or approximately identical) to the front-and-rear-direction-X location of the front-side-X1 end of the front plate 17. The front-and-rear-direction-X location of the rear-side-X2 end of the front deck supporting member 42 is identical (or approximately identical) to the front-and-rear-direction-X location of the rear-side-X2 end of the clewing frame reinforcement portion 19. The front deck supporting member 42 has a width in the front-and-rear direction X about twice the width of the rear deck supporting member 41 in the front-and-rear direction X.

The front deck supporting member 42 is disposed so as to be restrained from deformation at a fixed portion of the front deck supporting member 42, the fixed portion being fixed to the cab deck 30 (inner frame portion 31i). The front deck supporting member 42 is fixed to a high rigidity part of the cab deck 30. Specifically, (at least a part of) the front deck supporting member 42 is disposed so as to overlap (at least a part of) the cab deck reinforcement portion 35 when viewed along the lateral direction Y. In other words, the front deck supporting member 42 and the cab deck reinforcement portion 35 are disposed on the same straight line extending in the lateral direction Y.

The front deck supporting member 42 is opposed to the cab deck reinforcement portion 35 via the inner frame portion 31i. When viewed along the lateral direction Y, the connection portion of the front deck supporting member 42 to be connected to the inner frame portion 31i overlaps the connection portion of the cab deck reinforcement portion 35 to be connected to the inner frame portion 31i. When viewed along the up-and-down direction Z and the front-and-rear direction X, the connection potion (fixed portion) of the front deck supporting member 42 to be connected to the inner frame portion 31i is opposed to, via the inner frame portion 31i in the lateral direction Y, the connection potion (fixed portion) of the cab deck reinforcement portion 35 to be connected to the inner frame portion 31i.

Specifically, the front deck supporting member 42 is disposed, for example, as follows. When viewed along the lateral direction Y, the front deck supporting member 42 is disposed so as to overlap the cab mount reinforcement portion 35a (or a beam 35b) that reinforces the cab mount 33a. More specifically, when viewed along the lateral direction Y, the fixed portion of the front deck supporting member 42 to be fixed to the inner frame portion 31i is disposed so as to overlap the fixed portion of the cab mount reinforcement portion 35a (or the beam 35b) to be fixed to the inner frame portion 31i.

[Second Embodiment]

Figure 5:
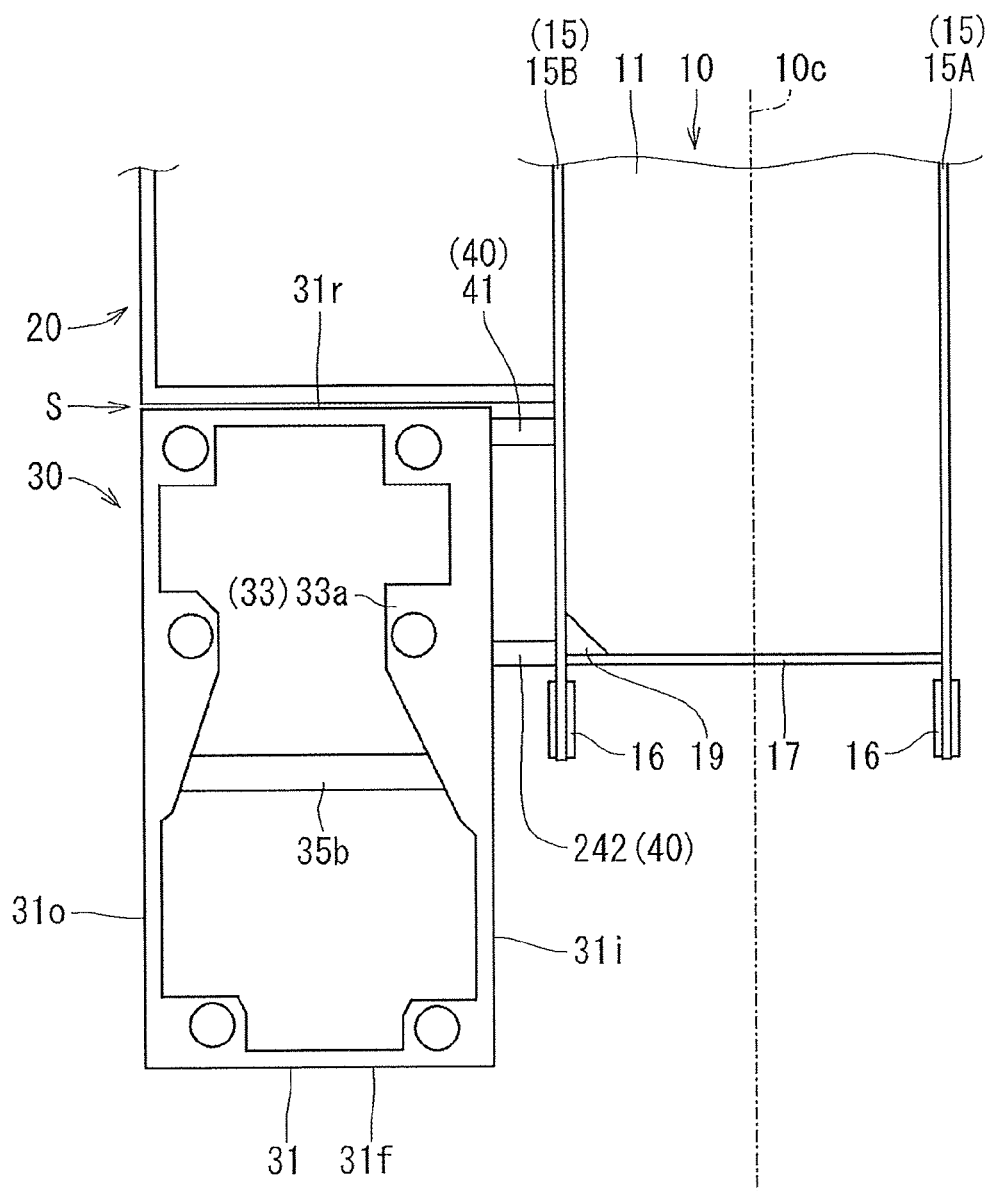
FIG. 5 is a view showing, in a manner similar to FIG. 3, an upper slewing body 201 according to a second embodiment.

With reference to FIG. 5, will be described a difference of an upper slewing body 201 of a second embodiment from that of the first embodiment (see FIG. 3). Components of the upper slewing body 201 of the second embodiment common to the first embodiment are given with the same reference signs as the first embodiment and description thereof is omitted. Likewise, description on the common components will be omitted for other embodiments. The upper slewing body 201 includes a second deck supporting member 242, which has a thickness half that of the front deck supporting member 42 of the embodiment described above (see FIG. 3) with respect to the front-and-rear direction X. The second deck supporting member 242 includes a rear-side-X2 end, which is located on the front side X1 of the rear-side-X2 end of the front deck supporting member 42 (see FIG. 3) of the embodiment described above and on the front side X1 of the rear-side-X2 end of the slewing frame reinforcement portion 19. Other configuration of the upper slewing body 201 is the same as the upper slewing body 1 (see FIG. 3).

[Comparison 1]

Respective vibrations of the cab decks 30 for various types of the upper slewing body are compared. Compared are those of the upper slewing body 1 (Model M1) shown in FIG. 3, the upper slewing body 201 (Model M2) shown in FIG. 5, an upper slewing body 401 (Model M3) of a comparative example shown in FIG. 16, and an upper slewing body 501 (Model M4) of a comparative example shown in FIG. 17.

Figure 16:
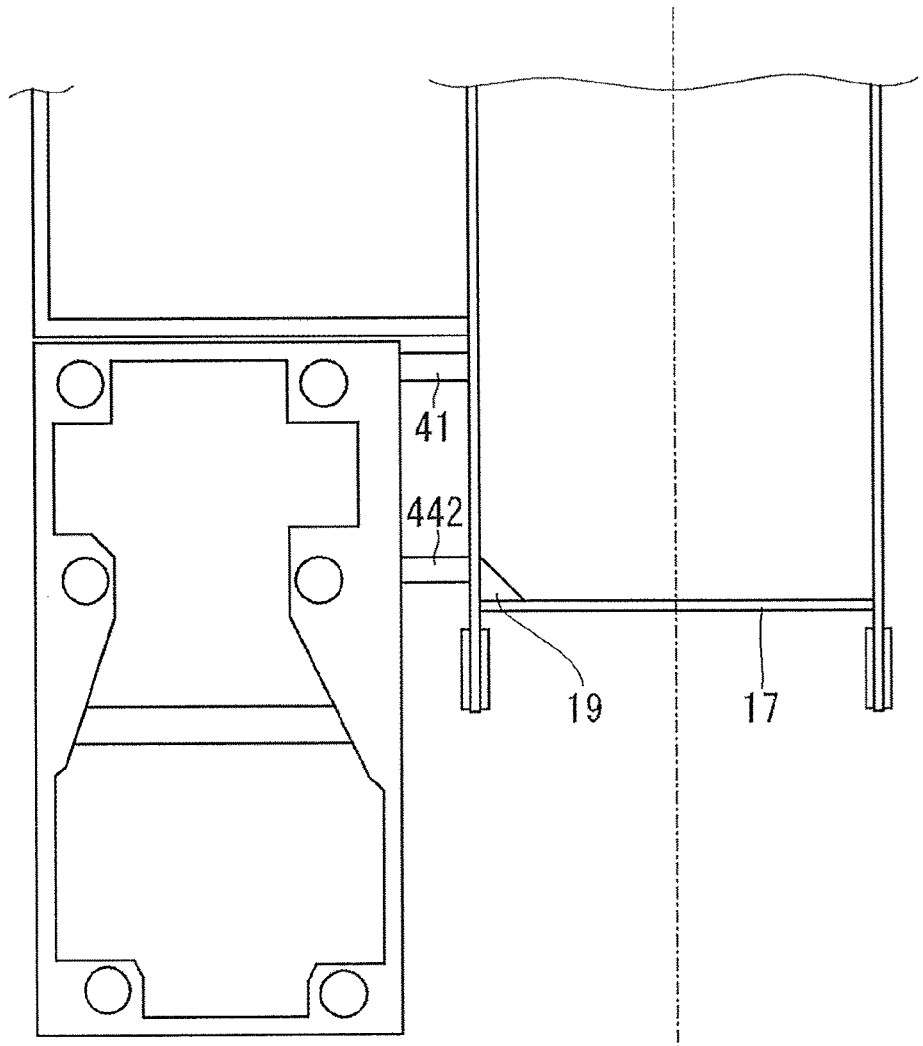
FIG. 16 is a view showing, in a manner similar to FIG. 3, an upper slewing body 401 of a comparative example.

The difference point of the upper slewing body 401 (see FIG. 16) of the comparative example from the upper slewing body 201 (see FIG. 5) is as follows. As shown in FIG. 16, the upper slewing body 401 has a deck supporting member 442, but it does not overlap the front plate 17 when viewed along the lateral direction Y. Specifically, the deck supporting member 442 has a front-side-X1 end, which is located on the rear side X2 of a rear-side-X2 end of the front plate 17. The front-and-rear-direction-X location of the rear-side-X2 end of the deck supporting member 442 is identical to the front-and-rear-direction-X location of the rear-side-X2 end of the slewing frame reinforcement portion 19.

Figure 17:
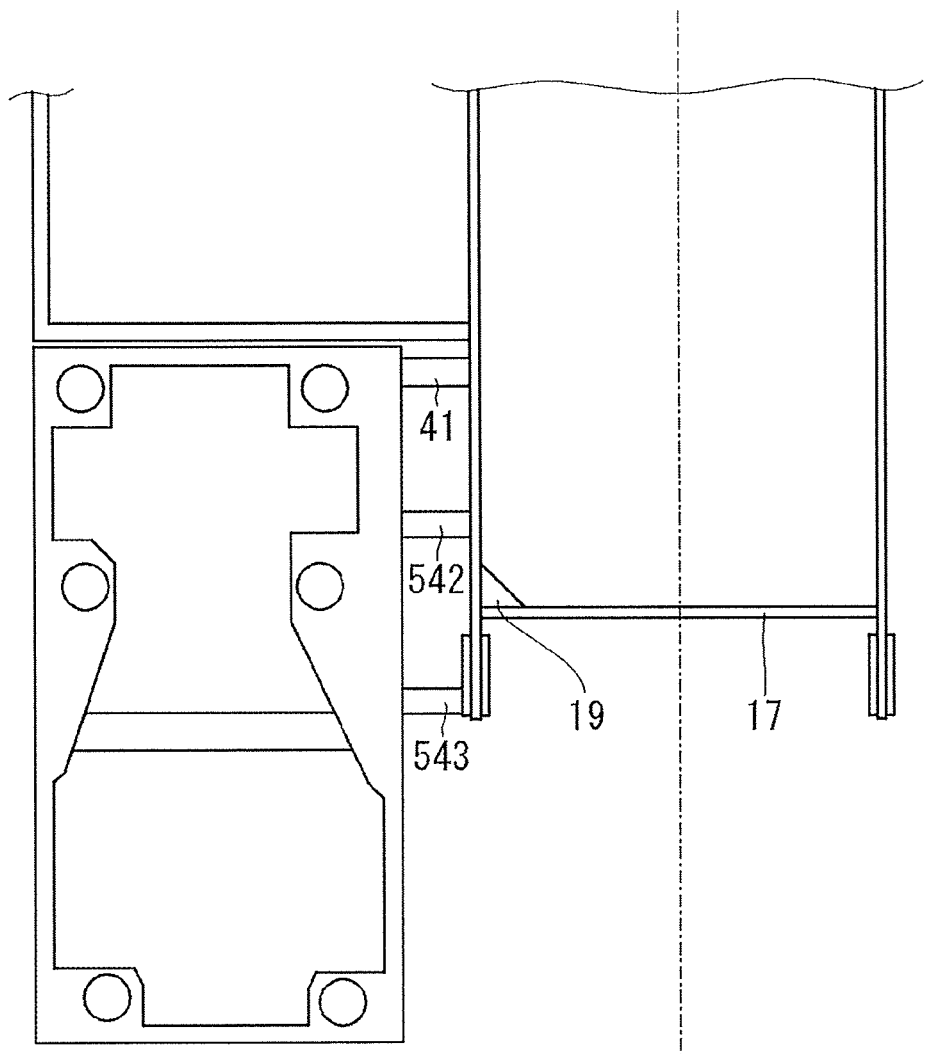
FIG. 17 is a view showing, in a manner similar to FIG. 3, an upper slewing body 501 of a comparative example.

The difference point of the upper slewing body 501 (see FIG. 17) of the comparative example from the upper slewing body 201 (see FIG. 5) is as follows. As shown in FIG. 17, the upper slewing body 501 includes a deck supporting member 542 and a deck supporting member 543 in place of the second deck supporting member 242 (see FIG. 5). The deck supporting member 542 and the deck supporting member 543 do not overlap the front plate 17 when viewed along the lateral direction Y. Specifically, the deck supporting member 542 has a front-side-X1 end, which is located on the rear side X2 of the rear-side-X2 end of the front plate 17 and on the rear side X2 of the rear-side-X2 end of the slewing frame reinforcement portion 19. The deck supporting member 543 has a rear-side-X2 end, which is located on the front side X1 of the front-side-X1 end of the front plate 17.

The second deck supporting member 242 shown in FIG. 5, the deck supporting member 442 shown in FIG. 16, the deck supporting member 542 and the deck supporting member 543 shown in FIG. 17 all have the same width in the front-and-rear direction X. The front deck supporting member 42 shown in FIG. 3 has a width in the front-and-rear direction X twice the width in the front-and-rear direction X of the deck supporting member 542 shown in FIG. 17. The front deck supporting member 42 shown in FIG. 3 can be regarded as an integration of the deck supporting member 542 and the deck supporting member 543 shown in FIG. 17. The supporting beams have the same width in the up-and-down direction Z.

Figure 18:
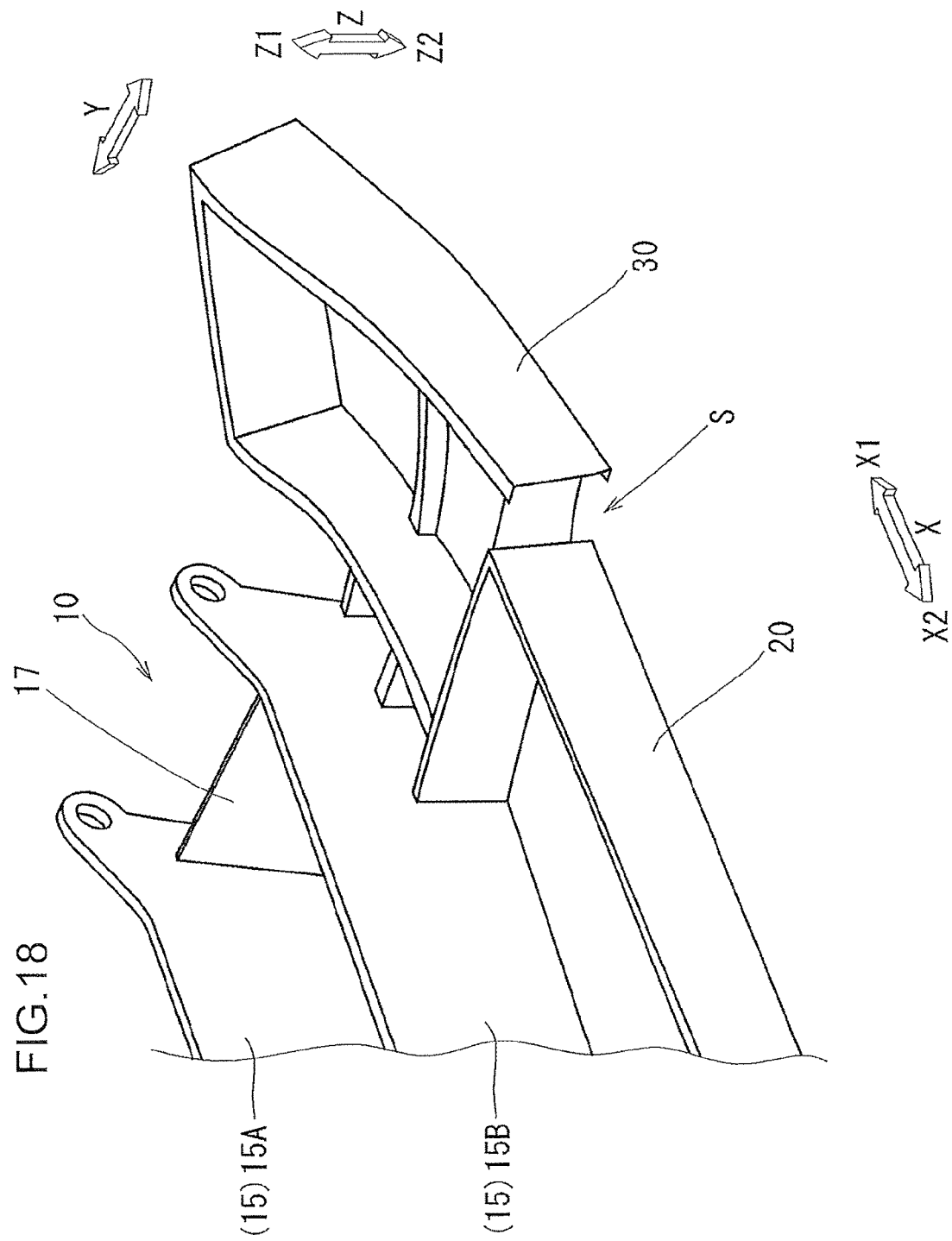
FIG. 18 shows a vibration mode of the cab deck 30.

Frequency response analysis is performed for Models M1 to M4 to calculate response acceleration in the up-and-down direction Z at the front-right part (the front-side-X1 end of the laterally-outer-side-Y2 end) of the cab deck 30 shown in the drawings including FIG. 3. Comparison is made among respective response accelerations of the Models M1 to M4 at a vibration-reduction target frequency (about 14 Hz). Details on the vibration-reduction target frequency is as follows. The engine deck 20 and the cab deck 30 shown in FIG. 3 are separated from each other in the front-and-rear direction X. This causes the vibration mode in which the cab deck 30 is deformed in both the lateral direction Y and the up-and-down direction Z shown in FIG. 18 to be dominant among the vibration modes of the cab deck 30. The frequency of the vibration of the cab deck 30 in the vibration mode shown in FIG. 18 is the vibration-reduction target frequency. In the first embodiment and the second embodiment, the vibration-reduction target frequency is about 14 Hz. Table 1 shows respective reduction ratios of the response accelerations as to Models M1 to M3 in comparison with that of Model M4 (see FIG. 17), at the vibration-reduction target frequency.

TABLE 1

| MODEL | ACCELERATION REDUCTION RATIO AT REDUCTION TARGET FREQUENCY |
|---|---|
| M1 | 72% |
| M2 | 19% |
| M3 | INCREASED BY 40% |

Model M1 (upper slewing body 1 shown in FIG. 3) shows a reduction (decrease) by about 72% from Model M4 (upper slewing body 501 shown in FIG. 17) in the response acceleration at the vibration-reduction target frequency. Model M1 shows a reduction by about 82% from Model M4 (not shown in Table 1) in the response acceleration at around 40 Hz. The sum of respective widths of the deck supporting members 40 in Model M1 in the front-and-rear direction X is identical to the sum of respective widths in the front-and-rear direction X of the supporting beams (the rear deck supporting member 41 and the deck supporting members 542 and 443) of Model 4. Model M1, nevertheless, shows a reduction from Model M4 in the response acceleration at frequencies including the vibration-reduction target frequency.

Model M2 (upper slewing body 201 shown in FIG. 5) shows a reduction by about 19% from Model M4 (see FIG. 17) in the response acceleration at the vibration-reduction target frequency. In spite that the sum of respective widths of the deck supporting members 40 in the front-and-rear direction X is smaller than (about ⅔ of) the sum of respective widths in the front-and-rear direction X of the supporting beams of Model M4, Model M2 shows a reduction from Model M4 in the response acceleration at the vibration-reduction target frequency. Besides, Comparison between Models M2 and M1 (see FIG. 3) teaches that the response acceleration is reduced with increase in the thickness of the deck supporting member 40 in the front-and-rear direction X.

Model M3 (upper slewing body 401 of the comparative example shown in FIG. 16) shows an increase by about 40% from Model M4 (see FIG. 17) in the response acceleration at the vibration-reduction target frequency.

[Effect 1]

The effect of the upper slewing body 1 shown in FIG. 1 is as follows. The upper slewing body 201 (see FIG. 5) also provides an effect similar to that of the upper slewing body 1. The upper slewing body 1 includes a slewing frame 10, an engine deck 20, a cab deck 30, and the front deck supporting member 42 (deck supporting member 40). The slewing frame 10 includes the first side plate 15A and the second side plate 15B opposed to each other in the lateral direction Y. The engine deck 20 is disposed on the laterally outer side Y2 of the slewing frame 10 and fixed to the slewing frame 10.

[Configuration 1-1] The cab deck 30 is disposed on the front side X1 of the engine deck 20 with a gap S between the cab deck 30 and the engine deck 20. The front deck supporting member 42 is connected to the second side plate 15B and the cab deck 30.

[Configuration 1-2] The slewing frame 10 includes the front plate 17 (side-plate supporting member) connected to the second side plate 15B. As shown in FIG. 3, when viewed along the up-and-down direction Z, the connection portion of the front plate 17 to be connected to the second side plate 15B is opposed to, in the lateral direction Y via the second side plate 15B, the connection portion of the front deck supporting member 42 to be connected to the second side plate 15B.

The upper slewing body 1 employs the above [Configuration 1-1]. This cause a case where the cab deck 30 is likely to be vibrated relatively to the slewing frame 10 as compared to the case of no gap S between the cab deck 30 and the engine deck 20 shown in FIG. 1 (where the cab deck 30 is directly connected to the engine deck 20). In this view point, the upper slewing body 1 employs the above [Configuration 1-2]. The [Configuration 1-2] enables the front deck supporting member 42 to be fixed to a part of the slewing frame 10, the part having a high rigidity, as compared to the case not employing [Configuration 1-2]. This allows the front deck supporting member 42 to he restrained from deformation, thus allowing the cab deck 30 to which the front deck supporting member 42 is fixed to be restrained from vibration. Specifically, for example, the vibration involving the deformation of the cab deck 30 in the up-and-down direction Z during the deformation of the cab deck 30 in the lateral direction Y (see FIG. 18) is reduced. This results in suppression of the vibration in the cab mounted on the cab deck 30.

The effect of suppressing vibration of the cab deck 30 is obtainable even without large increase in the mass of the deck supporting member 40 from that of a conventional upper slewing body. For example, vibration of the cab deck 30 can be suppressed even when the mass of the deck supporting member 40 is equal to or smaller than that of a conventional upper slewing body (refer to comparison between the embodiments and the comparative example). In other words, it is possible to allow the deck supporting member 40 to have a reduced mass while suppressing the vibration of the cab deck 30. The reduction in the mass of the deck supporting member 40 allows the upper slewing body 1 to have a reduced mass and further to have a reduced cost.

[Effect 2]

[Configuration 2] At least a part of the side-plate supporting member (a member connected to the second side plate 15B) is the front plate 17 connected to the first side plate 15A and the second side plate 15B.

The above [Configuration 2] involves utilization of the front plate 17, which is usually provided on the slewing frame 10, as the side-plate supporting member. This allows a simple configuration for suppressing the vibration of the cab deck 30 to be provided as compared to the case of no utilization of the front plate 17 as the side-plate supporting member.

[Effect 3]

As shown in FIG. 2, the cab deck 30 includes a frame portion 31 to which the front deck supporting member 42 (deck supporting member 40) is fixed, and a cab deck reinforcement portion 35 fixed to the frame portion 31.

[Configuration 3] The front deck supporting member 42 is disposed so as to overlap the cab deck reinforcement portion 35 when viewed along the lateral direction Y.

The above [Configuration 3] allows the front deck supporting member 42 to be fixed to a part of the cab deck 30, the part having a high rigidity, as compared to the case of not employing Configuration 3. This allows the front deck supporting member 42 to be restrained from deformation, thereby allowing the cab deck 30 to which the front deck supporting member 42 is fixed to be restrained from vibration.

[Third Embodiment]

Figure 6:
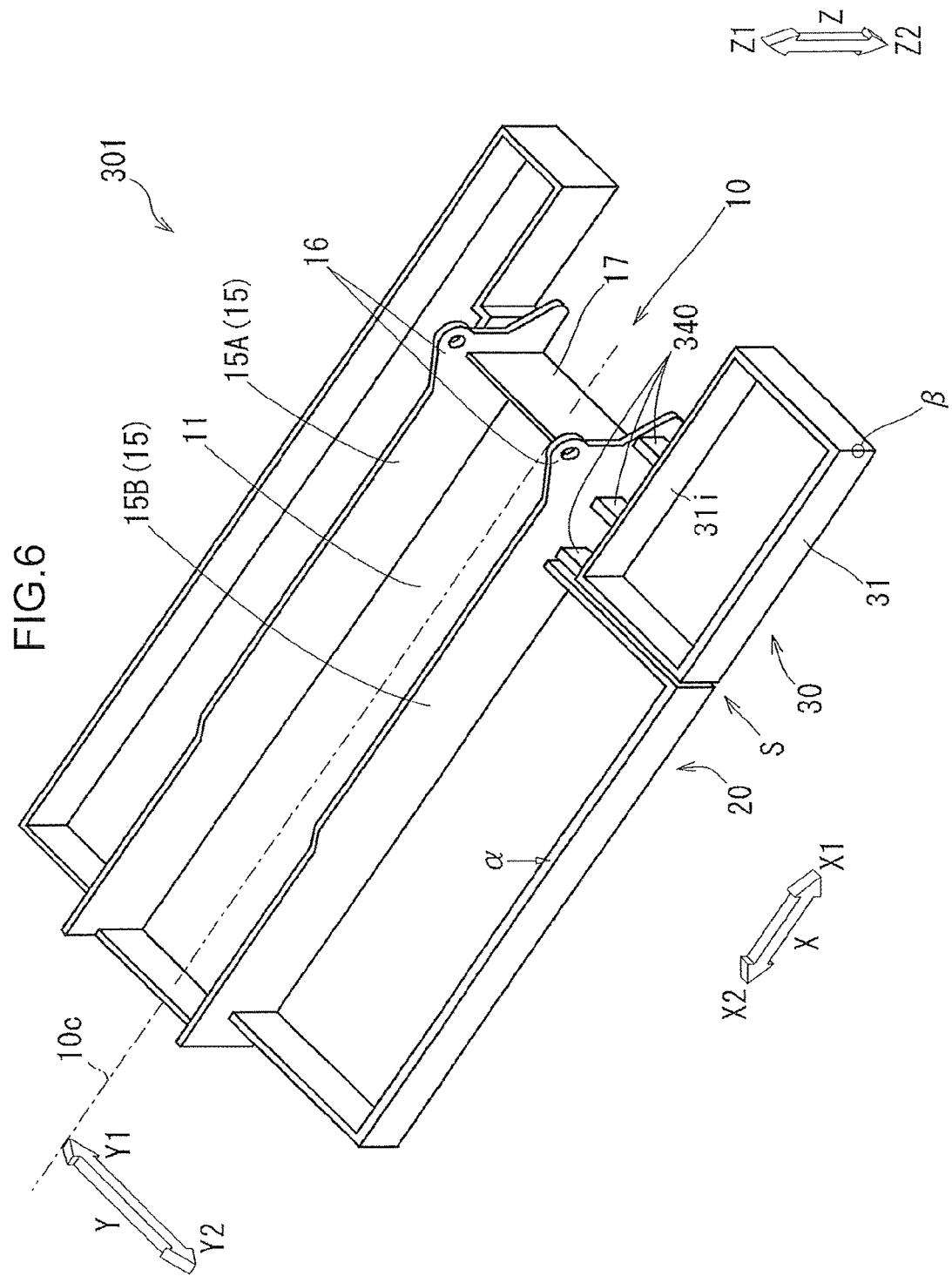
FIG. 6 is a perspective view showing an upper slewing body 301 according to a third embodiment.
Figure 7:
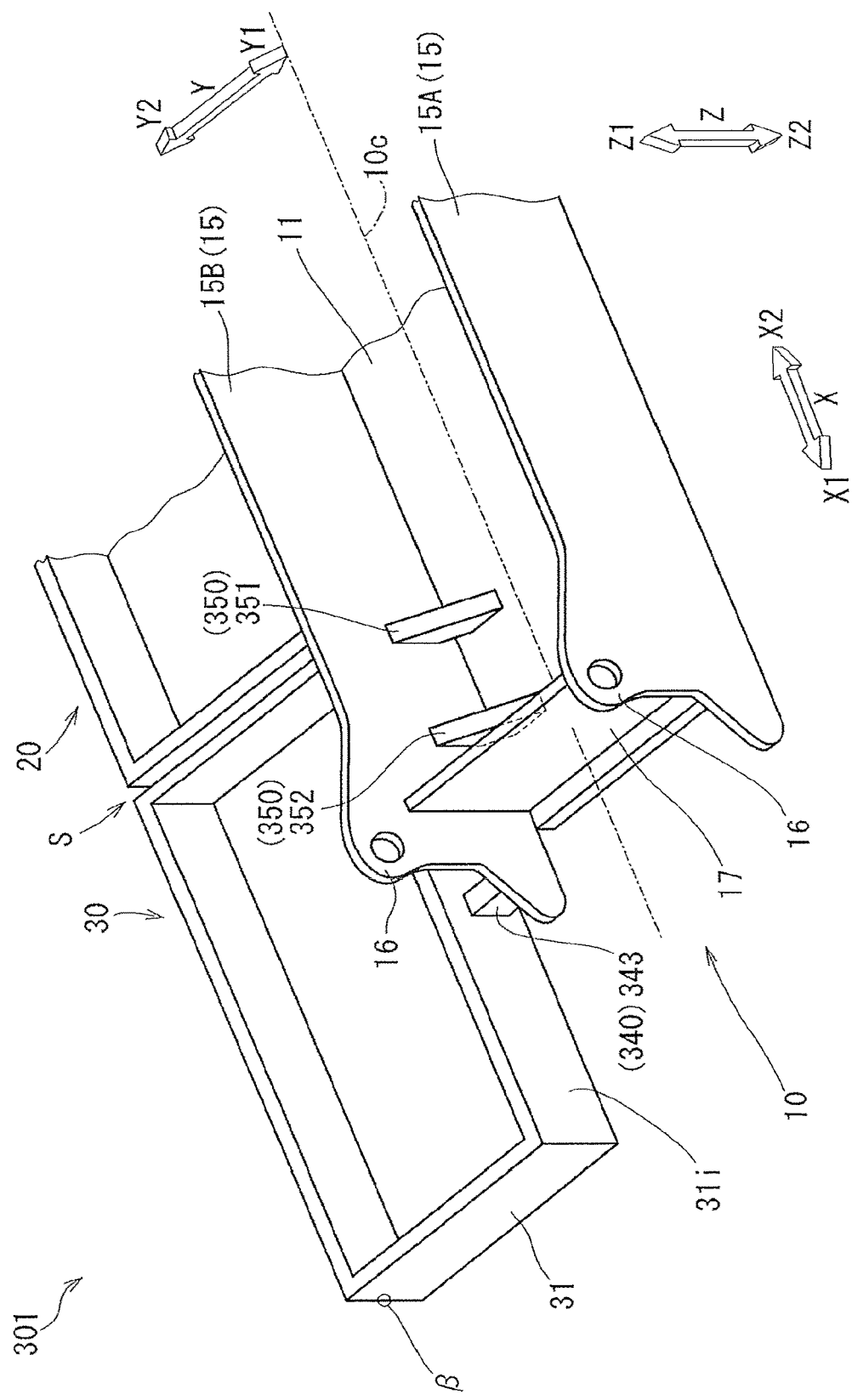
FIG. 7 is a perspective view showing components, such as a cab deck 30, shown in FIG. 6.

With reference to FIGS. 6 to 15, there will be described a difference point of an upper slewing body 301 of a third embodiment (see FIG. 6) from the first embodiment (see FIG. 1). As shown in FIG. 6, the upper slewing body 301 includes a deck supporting member 340 which is different, in location for example, from the deck supporting member 40 of the first embodiment (see FIG. 1). As shown in FIG. 7, the slewing frame 10 of the upper slewing body 301 includes a side-plate supporting member 350 which is not included in the slewing frame 10 of the first embodiment (see FIG. 3).

Figure 8:
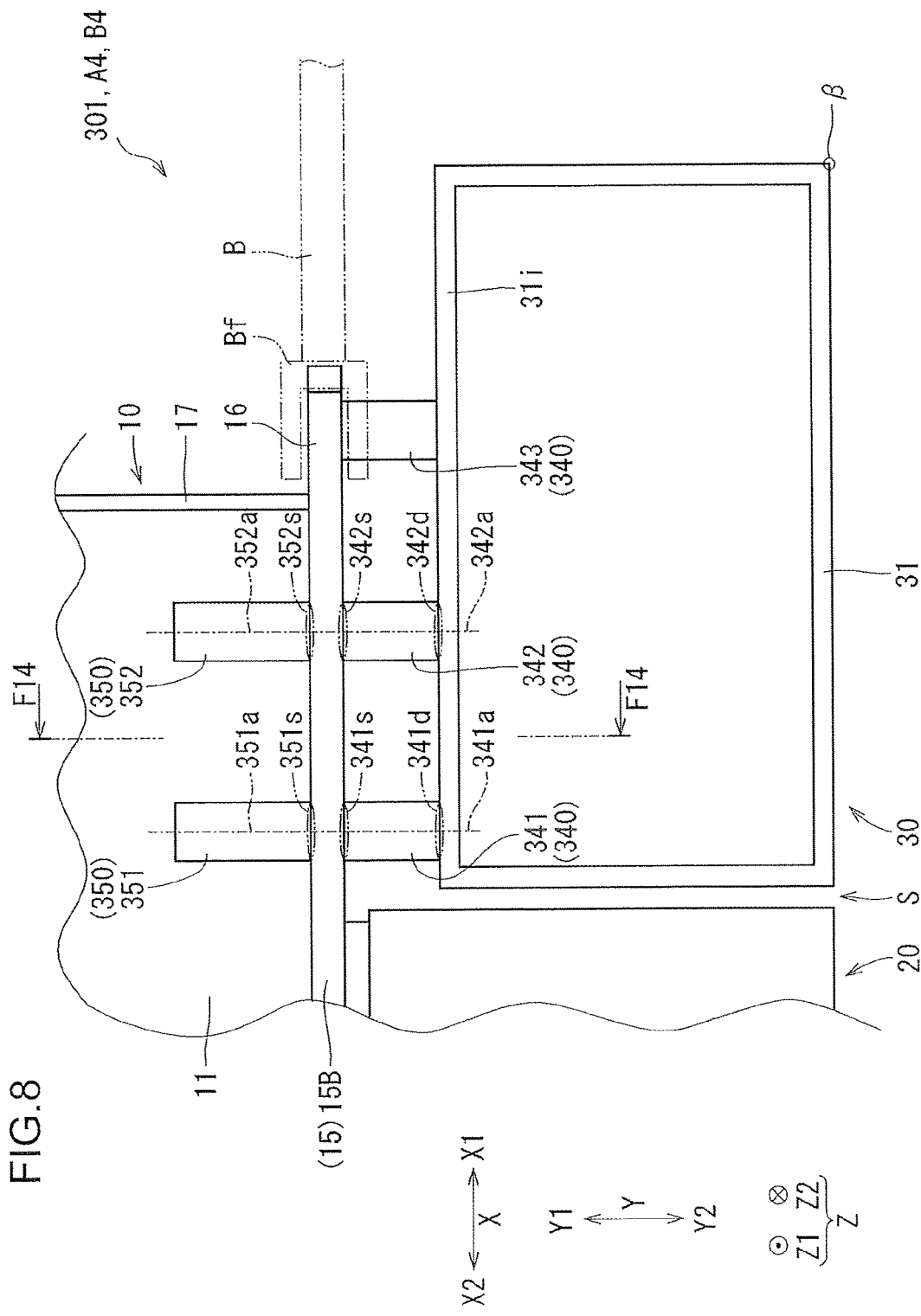
FIG. 8 shows components, such as a cab deck 30, shown in FIG. 6 viewed from upper side Z1.

The deck supporting member 340 is configured as follows. As shown in FIG. 1, the deck supporting member 40 of the first embodiment is constituted by two unit deck supporting members. In contrast, as shown in FIG. 6, the deck supporting member 340 of the third embodiment is constituted by three unit deck supporting members. As shown in FIG. 8, the unit deck supporting members includes a rear deck supporting member 341 (first deck supporting member), a middle deck supporting member 342 (second deck supporting member), and a front deck supporting member 343. Respective cross sectional shapes of the unit deck supporting members are the same as the cross sectional shape of the unit deck supporting member of the first embodiment.

The rear deck supporting member 341 (first deck supporting member) is disposed in the most rear side X2 position among the unit deck supporting members. The rear deck supporting member 341 has a central axis 341$a$, a connection portion 341$d$, and a connection portion 341$s$.

The central axis 341$a$ is a straight line linearly extending in the lateral direction Y and passes through the center of the rear deck supporting member 341. More specifically, the central axis 341$a$ passes through the center, in the front-and-rear direction X, of the rear deck supporting member 341 and the center, in the up-and-down direction Z, of the rear deck supporting member 341 (see FIG. 11).

The connection portion 341$d$ is a portion of the rear deck supporting member 341, the portion being connected to the cab deck 30 (inner frame portion 31$i$). The connection portion 341$d$ is located at a rear-side-X2 part of the inner frame portion 31$i$ (a part on the rear side X2 of the central part of the inner frame portion 31$i$ with respect to the front-and-rear direction X). More specifically, the connection portion 341$d$ is located in the vicinity of the end of the inner frame portion 31$i$ at the rear side X2.

The connection portion 341$s$ is a portion of the rear deck supporting member 341, the portion being connected to the second side plate 15B. The connection portion 341$s$ is disposed on the rear side X2 of the front plate 17. The connection portion 341$s$ is located on the front side X1 of the front-side-X1 end of the engine deck 20.

The middle deck supporting member 342 (second deck supporting member) is a unit deck supporting member, which is disposed on the front side X1 of the rear deck supporting member 341. The middle deck supporting member 342 has a central axis 342$a$, a connection portion 342$d$, and a connection portion 342$s$.

The central axis 342$a$ is a straight line linearly extending in the lateral direction Y and passes through the center of the middle deck supporting member 342 (refer to the description on "the center of the rear deck supporting member 341").

The connection portion 342$d$ is a portion of the middle deck supporting member 342, the portion being connected to the cab deck 30 (inner frame portion 31$i$). The connection portion 342$d$ is disposed at a rear-side X2 part of the inner frame portion 31$i$.

The connection portion 342$s$ is a portion of the middle deck supporting member 342, the portion being connected to the second side plate 15B. The connection portion 342$s$ is located on the rear side X2 of the front plate 17. The connection portion 341$s$ is located on the front side X1 of the front-side-X1 end of the engine deck 20.

The front deck supporting member 343 is a unit deck supporting member, which is disposed on the front side X1 of the middle deck supporting member 342. The front deck supporting member 343 has a connection portion to be connected to the cab deck 30 (inner frame portion 31$i$), the connection portion being located in the vicinity of the central part (or at the central part), in the front-and-rear direction X, of the inner frame portion 31$i$. The connection portion of the front deck supporting member 343 to be connected to the second side plate 15B is located on the front side X1 of the front plate 17 and in the vicinity of the end of the second side plate 15B in the front side X1.

As shown in FIG. 7, the side-plate supporting member 350 supports the side plate 15 on the bottom plate 11 to reinforce the bottom plate 11 and the side plate 15. The side-plate supporting member 350 is a member for suppressing vibration of the slewing frame 10, the deck supporting member 340 (see FIG. 6), and the cab deck 30. The side-plate supporting member 350 is disposed between the side plate 15 and the bottom plate 11 and connected (joined, linked, fixed) to the side plate 15 and the bottom plate 11. The side-plate supporting member 350 is connected to the second side plate 15B, which is the side plate 15 to which the deck supporting member 340 is connected. More specifically, the side-plate supporting member 350 has a laterally-outer-side-Y2 end, which is fixed to a surface (end surface) of the second side plate 15B on the laterally inner side Y1. The side-plate supporting member 350 has a lower-side-Z2 end, which is fixed to the top surface of the bottom plate 11. A plurality of, specifically two, side-plate supporting members 350 are provided. The side-plate supporting members 350 includes a rear side-plate supporting member 351 (first side-plate supporting member) and a front side-plate supporting member 352 (second side-plate supporting member).

As shown in FIG. 8, the rear side-plate supporting member 351 (first side-plate supporting member) is connected to the side plate 15 at a position behind the connection portion 341$s$. The rear side-plate supporting member 351 has a substantially bar-like shape. When viewed along the up-and-down direction Z, the shape of the rear side-plate supporting member 351 is, for example, a four-sided shape such as a rectangle (or a substantial rectangle). As shown in FIGS. 14 and others (FIGS. 11 to 15), the shape of the rear side-plate supporting member 351 when viewed along the front-and-rear direction X is, for example, a four-sided shape such as a trapezoid (or a substantial trapezoid). The shape of the rear side-plate supporting member 351 when viewed along the front-and-rear direction X may be a triangle. As shown in FIG. 14, the rear side-plate supporting member 351 has a central axis 351$a$, a connection portion 351$b$ to be connected to the bottom plate 11, and a connection portion 351$s$ to be connected to the second side plate 15B.

The central axis 351$a$ is a straight line passing through the center of the rear side-plate supporting member 351 so as to cross the connection portion 351$b$ and the connection portion 351$s$. The central axis 351$a$ passes through the central part of the connection portion 351$b$ and the central part of the connection portion 351$s$. More specifically, the central axis 351$a$ passes through the center (centroid) of the connection portion 351$b$ when viewed along the up-and-down direction Z and the center (centroid) of the connection portion 351$s$ when viewed along the lateral direction Y. As shown in FIG. 8, the central axis 351$a$ passes through the center, with respect to the front-and-rear direction X, of the rear side-plate supporting member 351. The central axis 351a, when viewed along the up-and-down direction Z, extends in the lateral direction Y. As shown in FIG. 14, the central axis 351a, when viewed along the front-and-rear direction X, inclines to the lateral direction Y and the up-and-down direction Z so as to be displaced to the upper side Z1 toward the laterally outer side Y2. When viewed along the front-and-rear direction X, the lower limit of the angle of the central axis 351a to the top surface of the bottom plate 11 is, for example, 20°, 30°, or 40°. The upper limit of the angle is, for example, 80°, 70°, or 60°.

The connection portion 351b is a portion of the rear side-plate supporting member 351, the portion being connected to the bottom plate 11. With increase in the distance in the lateral direction Y from the second side plate 15B to the connection portion 351b (as the connection portion 351b is located to the laterally inner side Y1), respective vibrations of the bottom plate 11 and the second side plate 15B are reduced. The connection portion 351b is located nearer to the second side plate 15B than the central line 10c of the slewing frame 10 (see FIG. 7) and also nearer to the second side plate 15B than a slewing-motor mounting part (not shown) on the bottom plate 11. The "slewing-motor mounting part" is a part (base) on which a stewing motor for slewing the upper slewing body 301 relatively to the lower travelling body (not shown) is mounted.

The connection portion 351s is a portion of the rear side-plate supporting member 351, the portion being connected to the second side plate 15B. The connection portion 351s is disposed so as to satisfy at least the following [Disposition a1].

[Disposition a1] As shown in FIG. 8, the connection portion 351s is disposed at a position where the connection portion 351s is opposed to the connection portion 341s in the lateral direction Y via the second side plate 15B when viewed along the up-and-down direction Z.

The connection portion 351s is disposed preferably so as to satisfy the following [Disposition a2].

[Disposition a2] As shown in FIG. 14, the connection portion 351s is disposed at a position where the connection portion 351s is opposed to (or approximately opposed to) the connection portion 341s in the lateral direction Y via the second side plate 15B when viewed along the front-and-rear direction X.

When the front-side-X1 end of the connection portion 351s and the rear-side-X2 end of the connection portion 341s shown in FIG. 8 are located at the same front-and-rear-direction-X location, [Disposition a1] is satisfied. When the rear-side-X2 end of the connection portion 351s and the front-side-X1 end of the connection portion 341s are located at the same front-and-rear-direction-X location, [Disposition a1] is satisfied.

Figure 12:
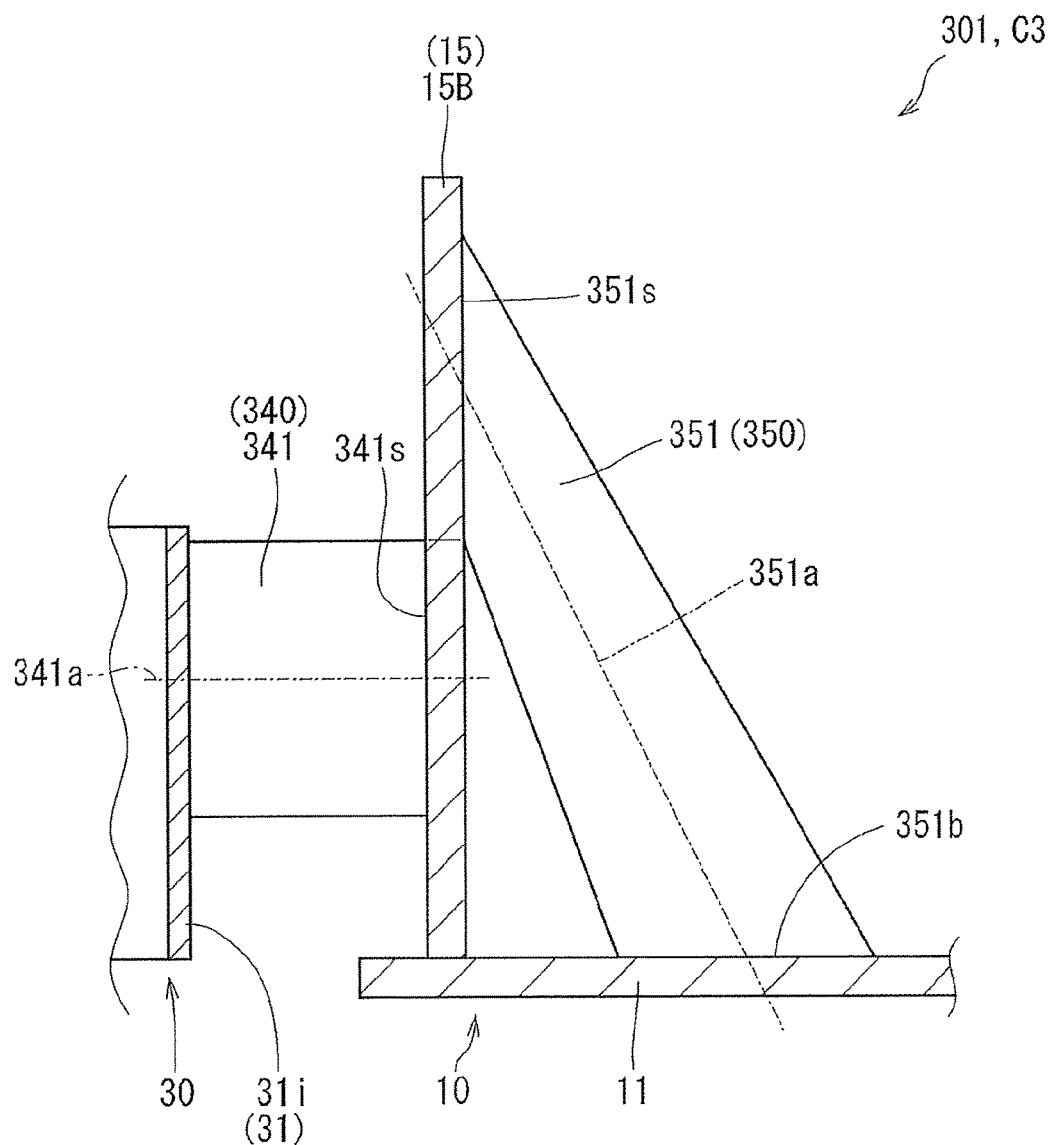
FIG. 12 shows Model C3 in a manner similar to FIG. 11.

When the upper-side-Z1 end of the connection portion 351s and the lower-side-Z2 end of the connection portion 341s shown in FIG. 14 are located in the same up-and-down-direction-Z location (location in the up-and-down direction Z, namely, the height), [Disposition a2] is satisfied. When the lower-side-Z2 end of the connection portion 351s and the upper-side-Z1 end of the connection portion 341s shown in FIG. 12 are located at the same up-and-down-direction-Z location, Disposition a2 is satisfied.

[Front-and-Rear-Direction-X Location of Connection Portion 351s]

Respective front-and-rear-direction-X locations (front-and-rear locations) of the connection portion 351s and the connection portion 341s shown in FIG. 8 coincide with each other. More specifically, the front-and-rear-direction-X location of the connection portion 351s satisfies the following [Disposition b].

[Disposition b] At least a part of the connection portion 351s is disposed on the front side X1 of the rear-side-X2 end of the connection portion 341s and on the rear side X2 of the front-side-X1 end of the connection portion 341s.

More specifically, the connection portion 351s satisfies the following [Disposition b1] and [Disposition b2].

[Disposition b1] The front-side-X1 end of the connection portion 351s is disposed on the front side X1 of the rear-side-X2 end of the connection portion 341s (for example, the end surface of the rear deck supporting member 341 in the rear side X2).

[Disposition b2] The rear-side-X2 end of the connection portion 351s is disposed on the rear side X2 of the front-side-X1 end of the connection portion 341s (for example, the end surface of the rear deck supporting member 341 in the front side X1).

It is preferable that the connection portion 351s satisfying the above [Disposition b] further satisfies the following [Disposition c].

[Disposition c] The connection portion 351s, when viewed along the up-and-down direction Z, is disposed so that the central axis 341a and the central axis 351a coincide with each other (for example, being in agreement or approximate agreement with each other).

[Location of Connection Portion 351s in Up-and-Down Direction Z]

As shown in FIG. 14, respective up-and-down-direction-Z locations of the connection portion 351s and the connection portion 341s coincide with each other. More specifically, the up-and-down-direction-Z location of the connection portion 351s satisfies the following [Disposition d].

[Disposition d] At least a part of the connection portion 351s is disposed on the lower side Z2 of the upper-side-Z1 end of the connection portion 341s and on the upper side Z1 of the lower-side-Z2 end of the connection portion 341s.

More specifically, the connection portion 351s satisfies the following [Disposition d1] and [Disposition d2].

[Disposition d1] The lower-side-Z2 end of the connection portion 351s is disposed on the lower side Z2 of the upper-side-Z1 end of the connection portion 341s (for example, the end surface of the rear deck supporting member 341 in the upper side Z1).

[Disposition d2] The upper-side-Z1 end of the connection portion 351s is disposed on the upper side Z1 of the lower-side-Z2 end of the connection portion 341s (for example, the end surface of the rear deck supporting member 341 in the lower side Z2).

The up-and-down-direction-Z location of the connection portion 351s may be determined as in Models C2 to C6 (details will be described below).

The front side-plate supporting member 352 (second side-plate supporting member) (see FIG. 8) is configured similarly to the rear side-plate supporting member 351. The difference point of the front side-plate supporting member 352 from the rear side-plate supporting member 351 is as follows. The front side-plate supporting member 352 is located on the front side X1 of the rear side-plate supporting member 351. The front side-plate supporting member 352 has a central axis 352a (corresponding to the central axis 351a of the rear side-plate supporting member 351), a connection portion (corresponding to the connection portion 351b, not shown) to be connected to the bottom plate 11, and a connection portion 352s (corresponding to the connection portion 351s) to be connected to the second side plate 15B. The connection portion 352s is disposed so as to be opposed to the connection portion 342s in the lateral direction Y via the second side plate 15B, at least when viewed along the up-and-down direction Z. The location (relative location) of the connection portion 352s to the connection portion 342s is determined in a manner similar to determining the location (relative location) of the connection portion 351s to the connection portion 341s.

[Comparison 2]

Regarding the upper slewing body 301 shown in FIG. 6 and others, responses in vibrational acceleration are calculated and vibration-reducing effects are compared (evaluations of the vibrations are performed). Details on the calculation and comparison are as follows. The response in vibrational acceleration at a response evaluation point β on the cab deck 30 is calculated under the condition where an excitation point α of the engine deck 20 is excited by an assumed external force applied by the engine to the engine deck 20. The excitation point α is located on the engine mounting part (where the engine is mounted) of the engine deck 20. The excitation force (unit excitation force) is 1 kgf. The excitation is applied in the up-and-down direction Z. The frequencies of the excitation include all frequencies that can be transmitted from the engine to the engine deck 20. The location of the response evaluation point β is a location where the amplitude of vibration is larger than those at other points in an actual machine, specifically being a location in the most front side X1 and the most laterally outer side Y2 of the cab deck 30. The evaluated frequency range is a low frequency range in which the vibration greatly affects the ride quality of an operator inside the cab, specifically, 10 to 25 Hz. Comparison is made for the peak vibrational amplitude in each of the front-and-rear direction X, the lateral direction Y, and the up-and-down direction Z at the response evaluation point β. The comparison is made by use of analysis models including detailed models of the slewing frame 10, the engine deck 20, and the cab deck 30. The analysis model is prepared with omitting the deck on the left side of the slewing frame 10 when viewed from the rear side X2 to the front side X1 and with modeling a cab, an engine, a tank, a radiator, a winch, and a gantry as a concentrated mass.

[Comparison 2-1]

The vibration-reducing effects are compared as to a plurality of models different in the number of the side-plate supporting member 350 shown in FIG. 8. The models used for the comparison are the following Models A1 to A4. Model A1 is the upper slewing body of the comparative example without the side-plate supporting member 350. The configuration of Model A1 other than the side-plate supporting member 350 is the same as the upper slewing body 301 of the embodiment (the same for Models A2 and A3). Model A2 is an upper slewing body of an exemplary modification of the embodiment. Model A2 does not include the rear side-plate supporting member 351 but includes the front side-plate supporting member 352, Model A3 is an upper slewing body of an exemplary modification of the embodiment that does not include the front side-plate supporting member 352 but includes the rear side-plate supporting member 351. Model A4 is the upper slewing body 301 of the embodiment. More specifically, Model A4 is obtained by modeling the upper slewing body 301 including the deck supporting member 340 and the side-plate supporting member 350 disposed as shown in FIG. 8.

[Result of Comparison 2-1]

Tables 2 to 4 shows the result of calculation. "VIBRATION-REDUCING EFFECT %" in the tables indicates by what amount the vibrational acceleration has been reduced for each model with respect to the vibrational acceleration in Model A1 that does not include the side-plate supporting member 350 (Tables 5 to 10 show the result in the same manner).

TABLE 2

VIBRATION IN FRONT-AND-REAR DIRECTION X

| MODEL | VIBRATIONAL ACCELERATION [mm/s^2] | VIBRATION-REDUCING EFFECT [%] |
|---|---|---|
| A1 | 9.65 | — |
| A2 | 9.80 | −1.55 |
| A3 | 8.10 | 16.06 |
| A4 | 7.99 | 17.20 |

TABLE 3

VIBRATION IN LATERAL DIRECTION Y

| MODEL | VIBRATIONAL ACCELERATION [mm/s^2] | VIBRATION-REDUCING EFFECT [%] |
|---|---|---|
| A1 | 9.50 | — |
| A2 | 9.41 | 0.95 |
| A3 | 7.90 | 16.84 |
| A4 | 7.80 | 17.89 |

TABLE 4

VIBRATION IN UP-AND-DOWN DIRECTION Z

| MODEL | VIBRATIONAL ACCELERATION [mm/s^2] | VIBRATION-REDUCING EFFECT [%] |
|---|---|---|
| A1 | 10.27 | — |
| A2 | 9.89 | 3.70 |
| A3 | 8.52 | 17.04 |
| A4 | 7.78 | 24.25 |

As shown in Table 2, with respect to in the front-and-rear direction X, respective vibrations in Models A3 and A4 are reduced as compared to that in Models A1 and A2. As shown in Tables 3 and 4, with respect to the lateral direction Y and the up-and-down direction Z, respective vibrations in Models A2, A3, and A4 are reduced as compared to that in Model A1.

It can be understood that the vibration-reducing effect in the case of providing only the front side-plate supporting member 352 (Model A2) with respect to the case of not including the side-plate supporting member 350 (Model A1) is small (specifically, refer to Tables 3 and 4). Meanwhile, a vibration-reducing effect exists even in the case of providing only the front side-plate supporting member 352.

It can be understood that the vibration-reducing effect in the case of providing only the rear side-plate supporting member 351 (Model A3) is larger than that in the case of providing only the front side-plate supporting member 352 (Model A2). This teaches that providing the rear side-plate supporting member 351 is critical to obtain the vibration-reducing effect.

It can be understood that the vibration-reducing effect in the case of providing the front side-plate supporting member 352 and the rear side-plate supporting member 351 (Model A4) is larger than that in the case of providing only the rear side-plate supporting member 351 (Model A3).

The reason why the rear side-plate supporting member 351 allows a larger vibration-reducing effect to be obtained than the front side-plate supporting member 352 is as follows. As shown in FIG. 6, the cab deck 30 is supported by the deck supporting member 340 on the slewing frame 10. This (providing the deck supporting member 340) causes the components, such as the cab deck 30, to have such a shape as shown in FIG. 18 in the vibration mode in a frequency range of 10 to 25 Hz where the response in vibrational acceleration is evaluated. Specifically, the cab deck 30 is vibrated in a complex mode in the front-and-rear direction X, the lateral direction Y, and the up-and-down direction Z with a support by the second side plate 15B (as an axis of deformation or of vibration). The location of the "support" (for example, the location of the axis of vibration in the lateral direction Y) may be on the second side plate 15B between the front deck supporting member 343 and the middle deck supporting member 342 shown in FIG. 8. Disposing the side-plate supporting member 350 far from the "support" allows vibrational deformation of components, such as the second side plate 15B, to be further suppressed than disposing the side-plate supporting member 350 close to the "support". Therefore, the rear side-plate supporting member 351 can contribute to a larger vibration-reducing effect than the front side-plate supporting member 351.

Details on the vibration-reducing effect obtained by providing the side-plate supporting member 350 is as follows. Vibration of the cab deck 30 causes the second side plate 15B to be pulled or pushed by the deck supporting member 340 to be thereby deformed (vibrated). It is assumed that the thickness of the second side plate 15B is increased to enhance the rigidity (strength) of the second side plate 15B. Increasing the rigidity of the second side plate 15B involves the decrease in the relative rigidity of other components (specifically, the bottom plate 11). This generates the possibility of vibration of the cab deck 30 with a support on the bottom plate 11. More specifically, generated is the possibility that the vibration mode (a vibration mode of the cab deck 30 and the vicinity thereof) due to the deck supporting member 340 become a vibration mode to be deformed (displaced) relatively to the bottom plate 11. This means that increasing only the rigidity of the second side plate 15B may be not enough to suppress the vibration of the cab deck 30 sufficiently. Besides, increasing the thickness of the second side plate 15B involves an increase in the mass of the second side plate 15B. In the case where the second side plate 15B contributes to the vibration not through its elasticity but through its momentum (as a weight), there is a possibility that increasing the thickness of the second side plate 15B is not enough to suppress the vibration of the cab deck 30 sufficiently. In contrast, as shown in FIG. 7, the side-plate supporting member 350 in the upper slewing body 301 of the embodiment can restrain the bottom plate 11, the second side plate 15B, and the deck supporting member 340 from deformation, thus suppressing the vibration of the cab deck 30 more surely than the model without the side-plate supporting member 350.

[Comparison 2-2: Comparison of Front-and-Rear-Direction-X Locations]

Figure 9:
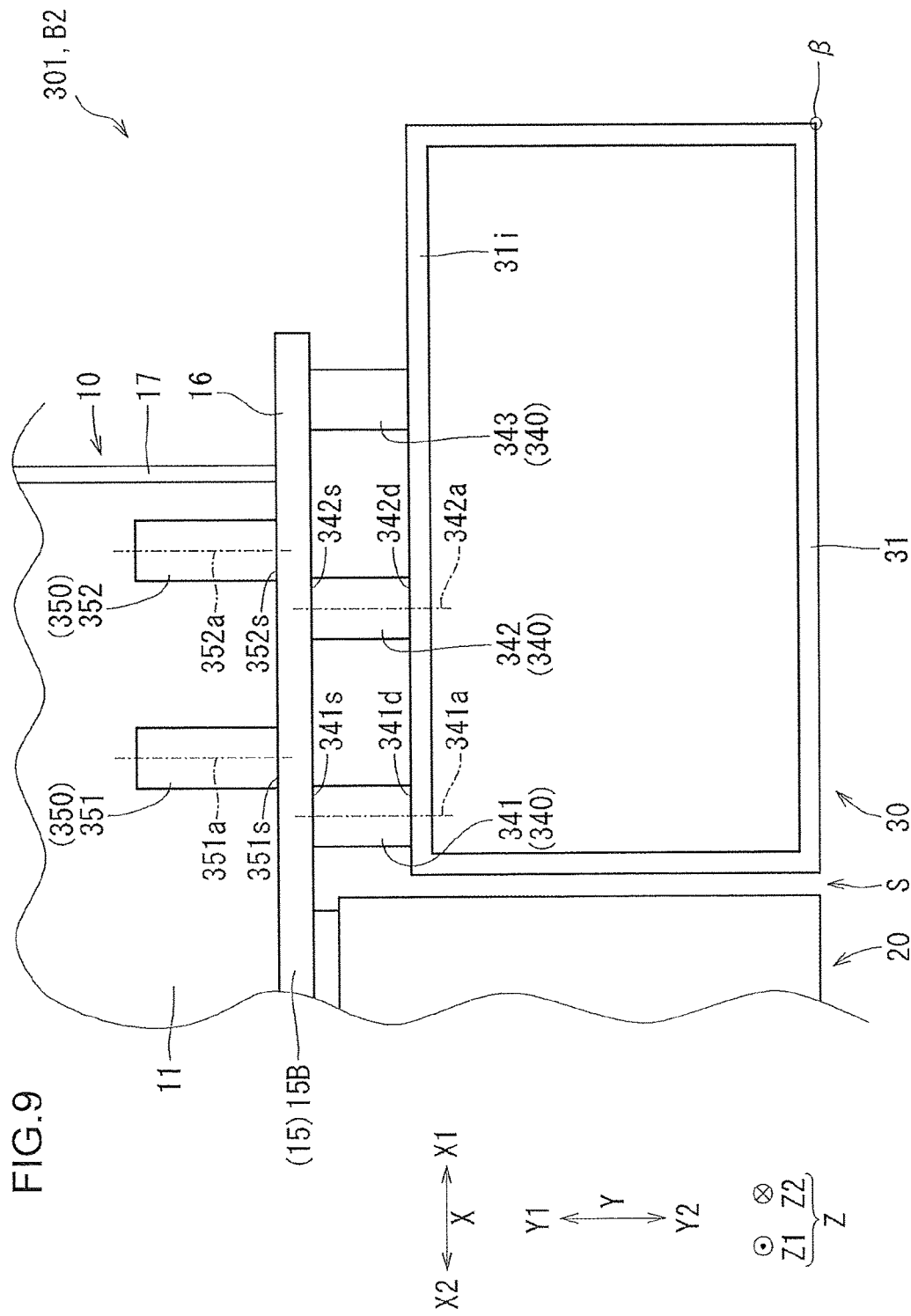
FIG. 9 shows Model B2 in a manner similar to FIG. 8.
Figure 10:
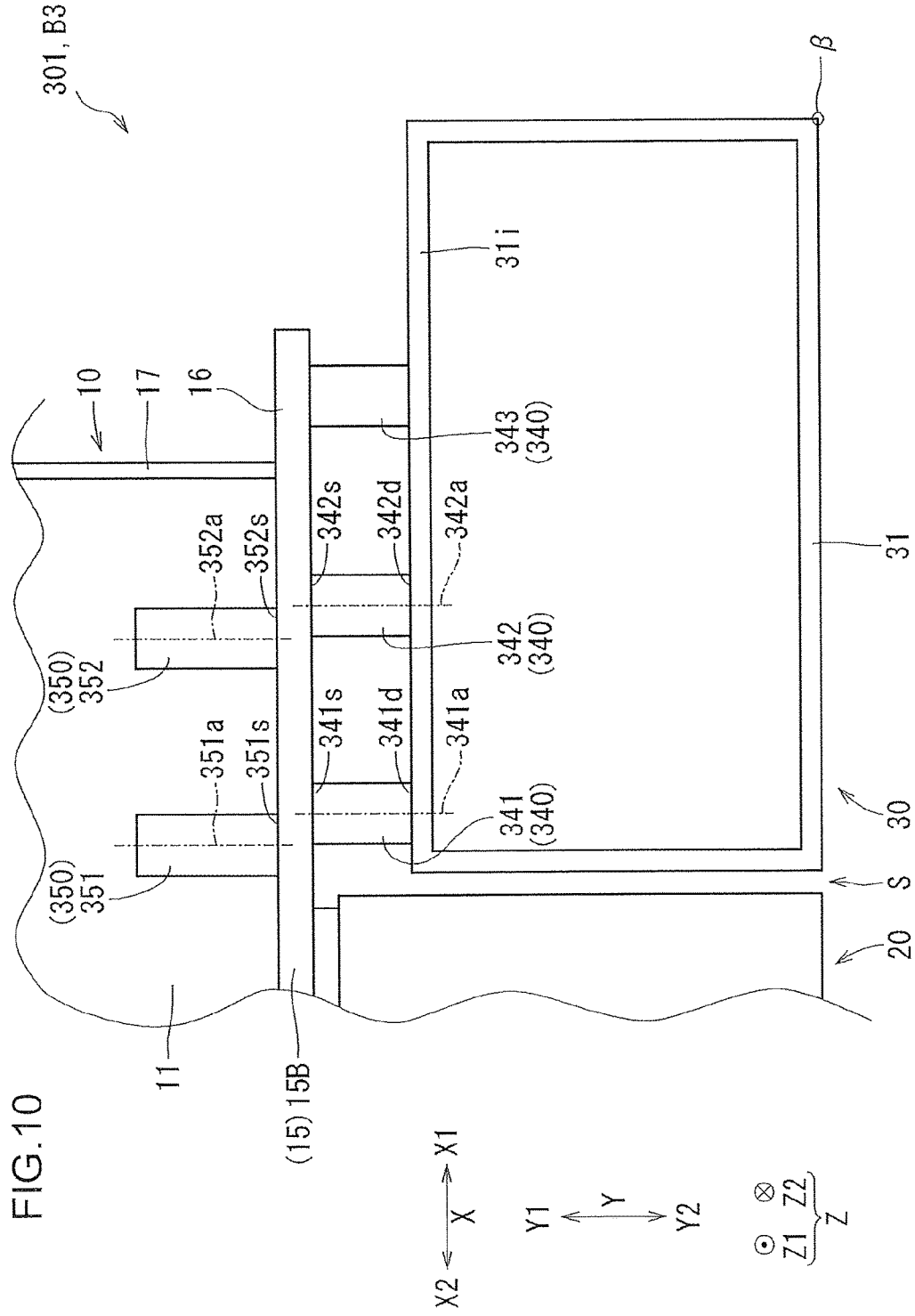
FIG. 10 shows Model B3 in a manner similar to FIG. 8.

Regarding a plurality of models different from each other in their front-and-rear-direction-X locations of the connection portions (the connection portion 351s and the connection portion 352s) of the side-plate supporting member 350 to be connected to the second side plate 15B, as shown in FIGS. 8, 9, and 10, respective vibration-reducing effects are compared. Used for the comparison are Models B1 to B4 described below. Model B1 is the same as Model A1, being an upper slewing body of the comparative example.

Each of Models B2 to B4 is the upper slewing body 301 of the embodiment. In Model B2 shown in FIG. 9, the disposition (relative disposition) of the rear side-plate supporting member 351 to the rear deck supporting member 341 is identical to the disposition (relative disposition) of the front side-plate supporting member 352 to the middle deck supporting member 342. These relative dispositions are the same for Models B3 and B4 as well as Models C2 to C6, D2, and D3 which will be described later. Below will be described the disposition of the rear side-plate supporting member 351 relatively to the rear deck supporting member 341.

In Model B2, as shown in FIG. 9, the central axis 351a is located on the front side X1 by 65 mm of the central axis 341a. In Model B2, the rear-side-X2 end of the connection portion 351s is slightly on the rear side X2 of the front-side-X1 end of the connection portion 341s. In Model B2, the front-side-X1 end of the connection portion 351s is on the front side X1 of the front-side-X1 end of the connection portion 341s.

In Model B3, as shown in FIG. 10, the central axis 351a is located on the rear side X2 by 32.5 mm of the central axis 341a. In Model B3, respective front-and-rear-direction-X locations of the front-side-X1 end of the connection portion 351s and the central axis 341a are identical (almost identical) to each other. In Model B3, the rear-side-X2 end of the connection portion 351s is on the rear side X2 on the rear-side-X2 end of the connection portion 341s.

In Model B4, as shown in FIG. 8, respective front-and-rear-direction-X locations of the central axis 351a and the central axis 341a are identical to each other (satisfying [Disposition c]). In Model B4, respective front-and-rear-direction-X locations of the rear-side-X2 end of the connection portion 351s and the rear-side-X2 end of the connection portion 341s are identical (almost identical) to each other. In Model B4, respective front-and-rear-direction-X locations of the front-side-X1 end of the connection portion 351s and the front-side-X1 end of the connection portion 341s are identical (almost identical) to each other.

[Result of Comparison 2-2]

Tables 5 to 7 show the result of calculation.

TABLE 5

VIBRATION IN FRONT-AND-REAR DIRECTION X

| MODEL | VIBRATIONAL ACCELERATION [mm/s^2] | VIBRATION-REDUCING EFFECT [%] |
|---|---|---|
| B1 | 9.65 | — |
| B2 | 8.62 | 10.67 |
| B3 | 8.68 | 10.05 |
| B4 | 7.99 | 17.20 |

TABLE 6

VIBRATION IN LATERAL DIRECTION Y

| MODEL | VIBRATIONAL ACCELERATION [mm/s^2] | VIBRATION-REDUCING EFFECT [%] |
|---|---|---|
| B1 | 9.50 | — |
| B2 | 8.03 | 15.47 |

TABLE 6-continued

VIBRATION IN LATERAL DIRECTION Y

| MODEL | VIBRATIONAL ACCELERATION [mm/s^2] | VIBRATION-REDUCING EFFECT [%] |
|---|---|---|
| B3 | 8.40 | 11.58 |
| B4 | 7.80 | 17.89 |

TABLE 7

VIBRATION IN UP-AND-DOWN DIRECTION Z

| MODEL | VIBRATIONAL ACCELERATION [mm/s^2] | VIBRATION-REDUCING EFFECT [%] |
|---|---|---|
| B1 | 10.27 | — |
| B2 | 9.27 | 9.74 |
| B3 | 8.63 | 15.97 |
| B4 | 7.78 | 24.25 |

As shown in Tables 5 to 7, respective vibrations in Models B2 to B4 are reduced in each direction, compared to that in Model B1 (comparative example). Vibration in Model B4 is further decreased than that in Models B2 and B3.

It can be understood that the vibration-reducing effect in the case of coincidence of respective front-and-rear-direction-X locations of the central axes (such as the central axis 341a and the central axis 351a) with each other (Model B4 in FIG. 8) is larger than that in the case of no coincidence of respective front-and-rear-direction-X locations of the central axes (see Model B2 in FIG. 9 and Model B3 in FIG. 10). This comparison indicates that shifting the front-and-rear-direction-X locations of the central axes from each other reduces the vibration-reducing effect. If the relative shift of the front-and-rear-direction-X locations of the central axes is increased more than the shift in Model B2 (see FIG. 9) or Model B3 (see FIG. 10), the vibration-reducing effect may be further decreased. It can also be understood that, meanwhile, even in the case of the shift in the front-and-rear-direction-X locations of the central axes (see Model B2 in FIG. 9 and Model B3 in FIG. 10), the vibration-reducing effect can exist as compared to the case without the side-plate supporting member 350 (Model B1).

[Comparison 2-3: Comparison of Up-and-Down-Direction-Z Locations]

Regarding a plurality of models different from each other in their up-and-down-direction-Z locations of the connection portions (the connection portion 351s and the connection portion 352s; see FIG. 8) of the side-plate supporting member 350 to be connected to the second side plate 15B, as shown in FIGS. 11 to 15, respective vibration-reducing effects are compared. Used for the comparison are Models C1 to C6 described below. Model C1 is the same as Model A1, being an upper slewing body of the comparative example.

Each of Models C2 to C6 is the upper slewing body 301 of the embodiment. In Models C2 to C6, as in Model B4 as shown in FIG. 8, respective front-and-rear-direction-X locations of the central axis 341a and the central axis 351a are identical to each other. As shown in FIGS. 11 to 15, respective connection portions 351s in Models C2, C3, C4, C5, and C6 are arranged to the lower side Z2 in this order.

Figure 11:
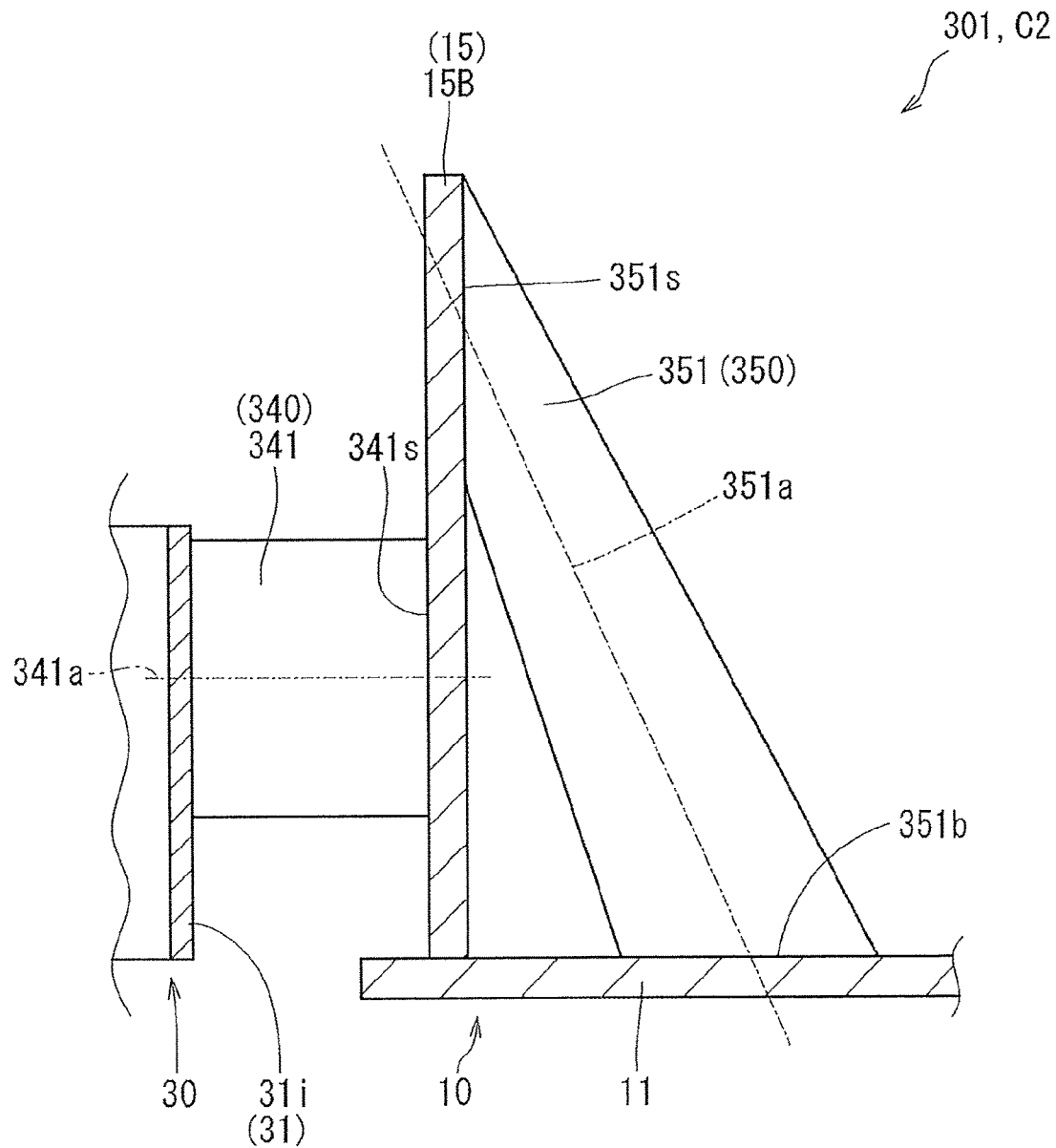
FIG. 11 is a view showing a side-plate supporting member 350 and a vicinity thereof shown in FIG. 7 viewed from front side X1, which is Model C2.

As shown in FIG. 11, in Model C2, respective up-and-down-direction-Z locations of the upper-side-Z1 end of the connection portion 351s and the upper-side-Z1 end of the second side plate 15B are identical to each other. In Model C2, the lower-side-Z2 end of the connection portion 351s is located on the upper side Z1 of the upper-side-Z1 end of the connection portion 341s (for example, on the upper side Z1 of the top surface of the rear deck supporting member 341). Model C2 satisfies [Disposition a1], while not satisfying [Disposition a2] nor [Disposition d].

As shown in FIG. 12, in Model C3, the upper-side-Z1 end of the connection portion 351s is on the lower side Z2 of the upper-side-Z1 end of the second side plate 15B. Respective up-and-down-direction-Z locations of the lower-side-Z2 end of the connection portion 351s and the upper-side-Z1 end of the connection portion 341s are identical to each other. Model C3 satisfies [Disposition a1] and [Disposition a2], while not satisfying [Disposition d].

Figure 13:
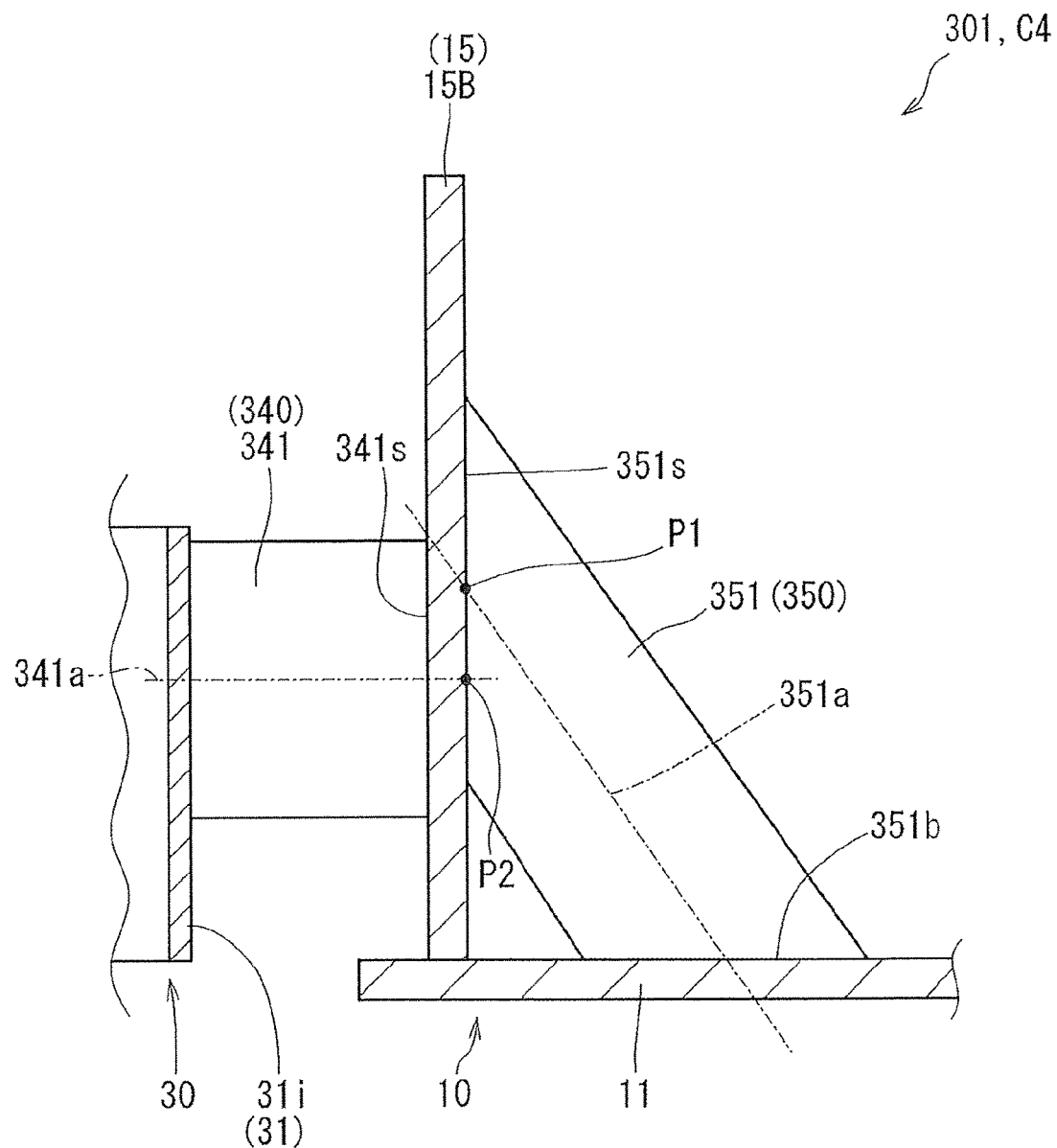
FIG. 13 is a sectional view taken along line F14-F14 in FIG. 8, showing Model C4 in a manner similar to FIG. 11.
Figure 14:
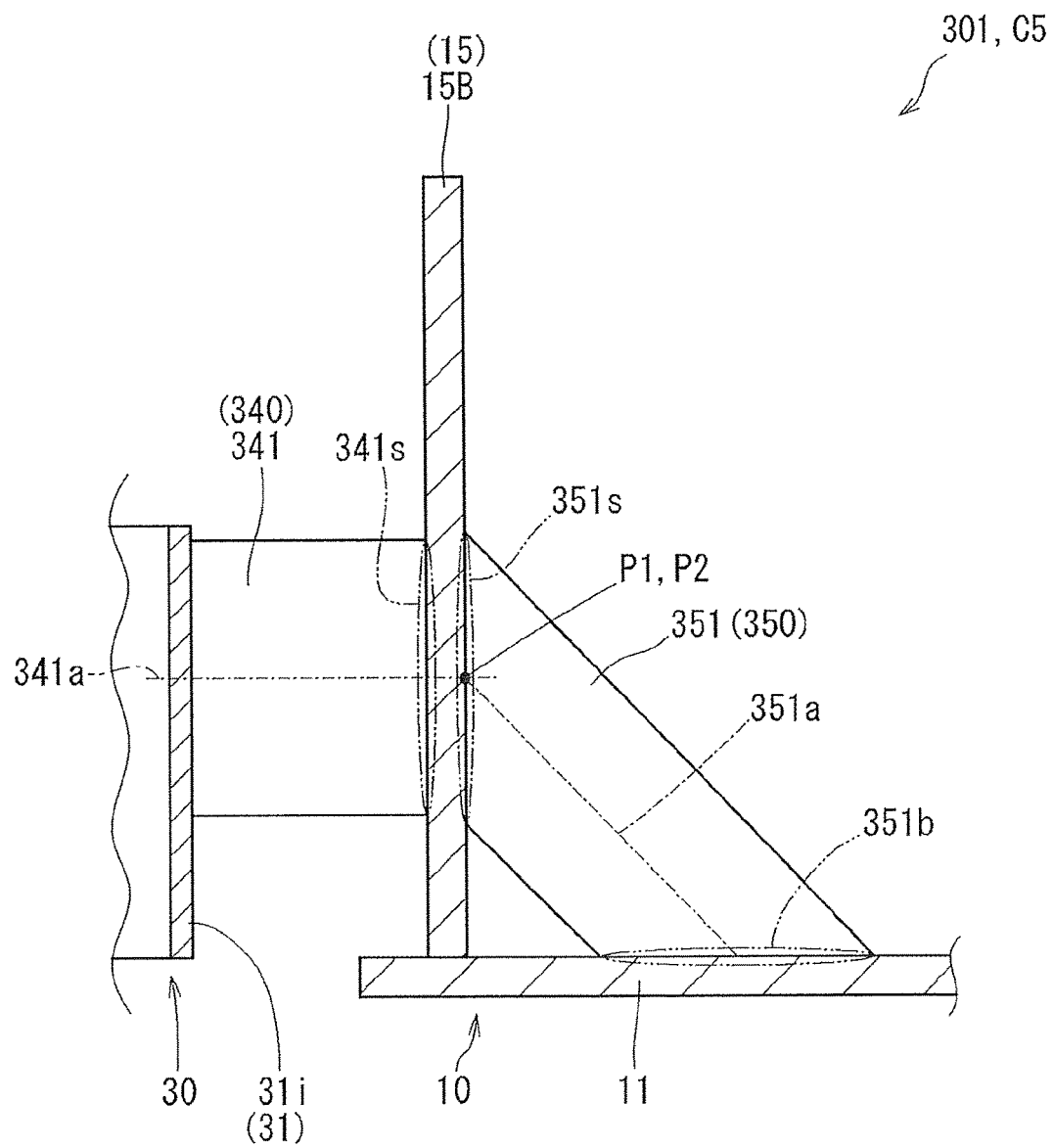
FIG. 14 shows Model C5 in a manner similar to FIG. 11.

As shown in FIG. 13, in Model C4, the location P1 of the central axis 351a in the connection portion 351s (the location where the central axis 351a crosses the connection portion 351s when viewed along the front-and-rear direction X) is on the upper side Z1 by 100 mm of the location P2 of the central axis 341a in the connection portion 351s. The location P1 is located on the lower side Z2 of the upper-side-Z1 end of the connection portion 341s. In Model C4, the upper-side-Z1 end of the connection portion 351s is located on the upper side Z1 of the upper-side-Z1 end of the connection portion 341s. In Model C4, the lower-side-Z2 end of the connection portion 351s is located on the lower side Z2 of the upper-side-Z1 end of the connection portion 341s and is located on the upper side Z1 of the lower-side-Z2 end of the connection portion 341s.

As shown in FIG. 14, in Model C5, respective up-and-down-direction-Z locations of the location P1 of the central axis 351a in the connection portion 351s and the location P2 of the central axis 341a in the connection portion 351s are identical to (coincident with) each other. In Model C5, respective up-and-down-direction-Z locations of the upper-side-Z1 end of the connection portion 351s and the upper-side-Z1 end of the connection portion 341s are identical (almost identical) to each other. In Model C5, respective up-and-down-direction-Z locations of the lower-side-Z2 end of the connection portion 351s and the lower-side-Z2 end of the connection portion 341s are identical (almost identical) to each other.

Figure 15:
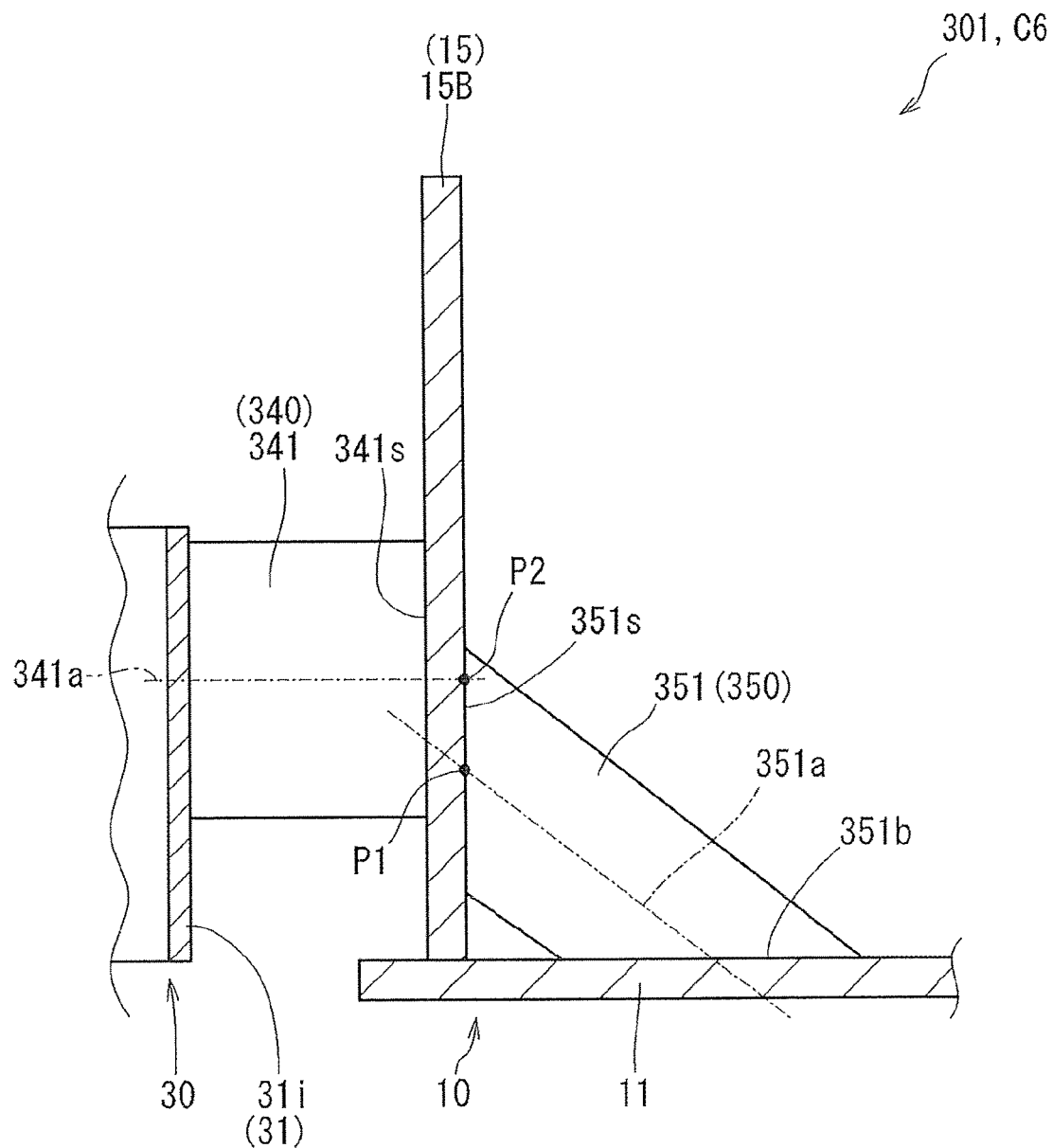
FIG. 15 shows Model C6 in a manner similar to FIG. 11.

As shown in FIG. 15, in Model C6, the location P1 of the central axis 351a in the connection portion 351s is located on the lower side Z2 by 100 mm of the location P2 on the central axis 341a in the connection portion 351s. In Model C6, the upper-side-Z1 end of the connection portion 351s is located on the lower side Z2 of the upper-side-Z1 end of the connection portion 341s and on the upper side Z1 of the lower-side-Z2 end of the connection portion 341s, for example, on the upper side Z1 of the central axis 341a. In Model C6, the lower-side-Z2 end of the connection portion 351s is located on the lower side Z2 of the lower-side-Z2 end of the connection portion 341s.

[Result of Comparison 2-3]

Tables 8 to 10 show the result of calculation.

TABLE 8

VIBRATION IN FRONT-AND-REAR DIRECTION X

| MODEL | VIBRATIONAL ACCELERATION [mm/s^2] | VIBRATION-REDUCING EFFECT [%] |
|---|---|---|
| C1 | 9.65 | — |
| C2 | 9.01 | 6.63 |

TABLE 8-continued

VIBRATION IN FRONT-AND-REAR DIRECTION X

| MODEL | VIBRATIONAL ACCELERATION [mm/s^2] | VIBRATION-REDUCING EFFECT [%] |
|---|---|---|
| C3 | 7.81 | 19.07 |
| C4 | 7.75 | 19.69 |
| C5 | 7.99 | 17.20 |
| C6 | 8.21 | 14.92 |

TABLE 9

VIBRATION IN LATERAL DIRECTION Y

| MODEL | VIBRATIONAL ACCELERATION [mm/s^2] | VIBRATION-REDUCING EFFECT [%] |
|---|---|---|
| C1 | 9.50 | — |
| C2 | 8.71 | 8.32 |
| C3 | 7.48 | 21.26 |
| C4 | 7.57 | 20.32 |
| C5 | 7.80 | 17.89 |
| C6 | 8.15 | 14.21 |

TABLE 10

VIBRATION IN UP-AND-DOWN DIRECTION Z

| MODEL | VIBRATIONAL ACCELERATION [mm/s^2] | VIBRATION-REDUCING EFFECT [%] |
|---|---|---|
| C1 | 10.27 | — |
| C2 | 9.72 | 5.36 |
| C3 | 8.49 | 17.33 |
| C4 | 7.73 | 24.73 |
| C5 | 7.78 | 24.25 |
| C6 | 7.84 | 23.66 |

As shown in Tables 8 to 10, respective vibrations in Models C2 to C6 in each of the front-and-rear direction X, the lateral direction Y, and the up-and-down direction Z are reduced as compared to that in Model C1 (comparative example). In Models C3 to C6, respective vibrations are further decreased than that in Model C2.

It can be understood that the vibration-reducing effect in the case of disposing the lower-side-Z2 end of the connection portion 351s on the upper side Z1 of the upper-side-Z1 end of the connection portion 341s (see Model C2 in FIG. 11) is smaller than that in the case of no such relative disposition (see Models C3 to C6 in FIGS. 12 to 15). It can also be understood that, even in such a case as Model C2, a vibration-reducing effect can exist as compared to the case without the side-plate supporting member 350 (Model C1).

Details on the up-and-down-direction-Z location of the connection portion 351s shown in FIG. 14 are as follows. The joint between the second side plate 15B and the bottom plate 11 has such a structure that the bottom plate 11 restrains the second side plate 15B from deformation. Therefore, in the second side plate 15B, a part on the upper side Z1 is likely to be deformed (vibrated) than a part on the lower side Z2. This allows it to be expected that locating the connection portion 351s on the upper side Z1 generates a greater vibration-reducing effect. Meanwhile, locating the connection portion 351s excessively on the upper side Z1 (excessively high) decreases the vibration-reducing effect. Specifically, the vibration-reducing effect in the case of disposing the lower-side-Z2 end of the connection portion 351s on the upper side Z1 of the upper-side-Z1 end of the connection portion 341s (see Model C2 in FIG. 11) is smaller than that in the case of having no such disposition (see Models C3 to C6 in FIGS. 12 to 15).

The upper-side-Z1 end of the second side plate 15B is usually stiffened to support the boom B (see FIG. 8) or a winch (not shown). However, stiffening the whole second side plate 15B increases mass and cost thereof. For this reason, the vicinity of the connection portion 341s of the second side plate 15B is usually not stiffened. Hence, without the side-plate supporting member 350, the vicinity of the connection portion 341s would be likely to be deformed.

[Comparison 2-4: Comparison of Lateral-Direction-Y Locations]

Regarding a plurality of models different from each other in their lateral-direction-Y locations of the connection portions 351b of the side-plate supporting member 350 shown in FIG. 14 to be connected to the bottom plate 11, respective vibration-reducing effects are compared. Used for the comparison are Models D1 to D3 described below. Model D1 is the same as Model A1, being an upper slewing body of the comparative example.

Each of Models D2 and D3 is the upper slewing body 301 of the embodiment. In Model D2, the laterally-inner-side-Y1 end of the connection portion 351b is located in a vicinity of (almost adjacent to) the slew-motor mounting part (not shown). In Model D3, the laterally-inner-side-Y1 end of the connection portion 351b is located on the second-side-plate-15B side (the laterally outer side Y2) by 120 mm of the slew-motor mounting part.

[Result of Comparison 2-4]

Tables 11 to 13 show the result of calculation.

TABLE 11

VIBRATION IN FRONT-AND-REAR DIRECTION X

| MODEL | VIBRATIONAL ACCELERATION [mm/s^2] | VIBRATION-REDUCING EFFECT [%] |
|---|---|---|
| D1 | 9.65 | — |
| D2 | 7.99 | 17.20 |
| D3 | 9.38 | 2.80 |

TABLE 12

VIBRATION IN LATERAL DIRECTION Y

| MODEL | VIBRATIONAL ACCELERATION [mm/s^2] | VIBRATION-REDUCING EFFECT [%] |
|---|---|---|
| D1 | 9.50 | — |
| D2 | 7.80 | 17.89 |
| D3 | 9.14 | 3.79 |

TABLE 13

VIBRATION IN UP-AND-DOWN DIRECTION Z

| MODEL | VIBRATIONAL ACCELERATION [mm/s^2] | VIBRATION-REDUCING EFFECT [%] |
|---|---|---|
| D1 | 10.27 | — |
| D2 | 7.78 | 24.25 |
| D3 | 9.22 | 10.22 |

As shown in Tables 11 to 13, the vibrations in each direction in Models D2 and D3 are decreased as compared to that in Model D1 (comparative example). Vibration in Model D2 is decreased as compared to that in Model D3. It can be considered that, with increase in the shift of the connection portion 351b to the laterally inner side Y1 in the lateral direction Y (with increase in the distance from the second side plate 15B and with close to the slew-motor mounting part), the vibration-reducing effect should be enhanced.

[Effect 4]

The effect obtained by the upper slewing body 301 shown in FIG. 6 is as follows. The slewing frame 10 includes the bottom plate 11 extending in the front-and-rear direction X. The second side plate 15B extends to the upper side Z1 beyond the bottom plate 11.

[Configuration 4] As shown in FIG. 7, the side-plate supporting member 350 is connected to the second side plate 15B and the bottom plate 11.

the above [Configuration 4] enables the side-plate supporting member 350 to restrain the bottom plate 11 and the second side plate 15B from vibration. This makes it possible to suppress the vibration of the deck supporting member 340 connected to the second side plate 15B and to thereby suppress the vibration of the cab deck 30 connected to the deck supporting member 340.

[Effect 5]

As shown in FIG. 8, the deck supporting member 340 is constituted by a plurality of unit deck supporting members (including the rear side-plate supporting member 351).

[Configuration 5-1] The deck supporting member 340 includes the rear deck supporting member 341. Among the unit deck supporting members, the rear deck supporting member 341 is disposed in the most rear-side-X2 position and connected to the rear-side-X2 part of the cab deck 30.

[Configuration 5-2] When viewed along the up-and-down direction Z, the connection portion 351s of the rear side-plate supporting member 351 to be connected to the second side plate 15B is opposed to, in the lateral direction Y via the second side plate 15B, the connection portion 341s of the rear deck supporting member 341 to be connected to the second side plate 15B.

The rear-side-X2 part of the cab deck 30 is likely to make a greater vibration than the front-and-rear-direction-X central part of the cab deck 30. For this reason, the rear deck supporting member 341 is connected to the rear-side-X2 part of the cab deck 30 (as [Configuration 5-1]). The connection portion 341s is located so as to be opposed to the connection portion 351s in the lateral direction Y via the second side plate 15B when viewed along the up-and-down direction Z (as [Configuration 5-2]). This enables the rear side-plate supporting member 351 to suppress the vibration of the rear-side-X2 part of the cab deck 3 where the vibration is likely to be great, thereby making it possible to more surely restrain the cab deck 30 from vibration.

[Effect 6]

[Configuration 6] The front-side-X1 end of the connection portion 351s of the rear side-plate supporting member 351 to be connected to the second side plate 15B is located on the front side X1 of the rear-side-X2 end of the connection portion 341s of the rear deck supporting member 341 to be connected to the second side plate 15B. The rear-side-X2 end of the connection portion 351s of the rear side-plate supporting member 351 to be connected to the second side plate 15B is located on the rear side X2 of the front-side-X1 end of the connection portion 341s of the rear deck supporting member 341 to be connected to the second side plate 15B.

The above [Configuration 6] enables the rear side-plate supporting member 351 to more surely restrain the rear deck supporting member 341 from vibration, thereby making it possible to suppress the vibration of the cab deck 30.

[Effect 7]

[Configuration 7] When viewed along the up-and-down direction Z, the central axis 341a passing through the center, in the front-and-rear direction X, of the rear deck supporting member 341 and the central axis 351a passing through the center, in the front-and-rear direction X, of the rear side-plate supporting member 351 coincide with each other.

The above [Configuration 7] enables the rear side-plate supporting member 351 to more surely restrain the rear deck supporting member 341 from vibration (see Comparison 2-2 for details), thereby more surely suppressing the vibration of the cab deck 30.

[Effect 8]

[Configuration 8] As shown in FIG. 14, the lower-side-Z2 end of the connection portion 351s of the rear side-plate supporting member 351 to be connected to the second side plate 15B is located on the lower side Z2 of the upper-side-Z1 end of the connection portion 341s of the rear deck supporting member 341 to be joined to the second side plate 15B. The upper-side-Z1 end of the connection portion 351s of the rear side-plate supporting member 351 to be connected to the second side plate 15B is located on the upper side Z1 of the lower-side-Z2 end of the connection portion 341s of the rear deck supporting member 341 to be connected to the second side plate 15B.

The above [Configuration 8] enables the rear side-plate supporting member 351 to more surely restrain the rear deck supporting member 341 from vibration (see Comparison 2-3 for details). This makes it possible to more surely suppress the vibration of the cab deck 30.

[Effect 9]

As shown in FIG. 8, the deck supporting member 340 includes the middle deck supporting member 342 disposed on the front side X1 of the rear deck supporting member 341.

[Configuration 9-1] The side-plate supporting member 350 includes the rear side-plate supporting member 351 and the front side-plate supporting member 352.

[Configuration 9-2] When viewed along the up-and-down direction Z, the rear side-plate supporting member 351 is opposed to, in the lateral direction Y via the second side plate 15B, the connection portion 341s of the rear deck supporting member 341 to be connected to the second side plate 15B (see Configuration 5-2).

[Configuration 9-3] The front side-plate supporting member 352 is located on the front side X1 of the rear side-plate supporting member 351. When viewed along the up-and-down direction Z, the front side-plate supporting member 352 is opposed to, in the lateral direction Y via the second side plate 15B, the connection portion 342s of the middle deck supporting member 342 to be connected to the second side plate 15B.

The upper slewing body 301 employs [Configuration 9-1] and [Configuration 9-3]. This allows not only the rear side-plate supporting member 351 to restrain the cab deck 30 from vibration through the rear deck supporting member 341 but also the front side-plate supporting member 352 to restrain the vibration of the cab deck 30 from vibration through the middle deck supporting member 342. The cab deck 30 is, thus, allowed to be restrained from vibration more surely than that in the case without the front side-plate supporting member 352 (refer to [Comparison 2-1] for details).

[Other Exemplary Modifications]

The embodiments (and exemplary modifications) described above may be modified in a variety of ways. It is possible to use respective components of different embodiments in combination. For example, the following [Configuration a] and [Configuration b] can be combined. [Configuration a] As shown in FIG. 3, when viewed along the up-and-down direction Z, the connection portion of the front deck supporting member 42 to be connected to the second side plate 15B is opposed to, in the lateral direction Y via the second side plate 1513, the connection portion of the front plate 17 to be connected to the second side plate 15B. [Configuration b] As shown in FIG. 8, when viewed along the up-and-down direction Z, the connection portion 341s is opposed to the connection portion 351s in the lateral direction Y via the second side plate 15B. Besides, it is also possible, for example, to combine respective configurations (conditions) of Models A3, A4, B2 to B4, C2 to C6, and D2 to D3 shown in FIGS. 8 to 15.

Some components of the embodiments do not have to be provided. For example, the slewing frame reinforcement portion 19 shown in FIG. 3 may not be provided. For example, the front deck supporting member 343 shown in FIG. 8 may not be provided.

The number of components in the embodiments may be changed. For example, although FIG. 1 shows two side plates 15 provided to be fixed on both ends (or near both ends), in the laterally outer sides Y2, of the bottom plate 11, the number and location of the side plates 15 may be changed. For example, more than two side plates 15 may be provided: it is also possible to provide a plurality of side plates 15 on each of one side and the other side of the central line 10c with respect to the lateral direction Y.

Although the first embodiment employs two deck supporting members 40 as shown in FIG. 3, three or more deck supporting members 40 may be provided. Although the third embodiment employs three deck supporting members 340 as shown in FIG. 8, only two or less deck supporting members 340 or four or more deck supporting members 340 may be provided. The number of the side-plate supporting members 350, though being two in the third embodiment and one in the exemplary modification (Model A3), may be three or more.

The shape of components may be suitably changed. For example, the shape of the deck supporting member 40 may be suitably changed.

As shown in FIG. 3, the front deck supporting member 42 is disposed so as to overlap the cab mount reinforcement portion 35a when viewed along the lateral direction Y; however, the front deck supporting member 42 may be disposed so as to overlap, when viewed along the lateral direction Y, a cab deck reinforcement portion 35 which is other than the cab mount reinforcement portion 35a, or alternatively, so as not to overlap, when viewed along the lateral direction Y, the cab deck reinforcement portion 35.

It is also permitted that the location (relative location) of the rear side-plate supporting member 351 to the rear deck supporting member 341 shown in FIG. 8 differs from the location (relative location) of the front side-plate supporting member 352 to the middle deck supporting member 342.

REFERENCE SIGNS

1, 201, 301 upper slewing body
10 slewing frame
11 bottom plate
15A first side plate
15B second side plate
17 front plate (side-plate supporting member)
20 engine deck
30 cab deck
31 frame part
35 cab deck reinforcement portion 40, 340 deck supporting member
341 rear deck supporting member (first deck supporting member)
341a central axis
342 middle deck supporting member (second deck supporting member)
350 side-plate supporting member
351 rear side-plate supporting member (first side-plate supporting member)
351a central axis
352 front side-plate supporting member (second side-plate supporting member)
S gap

The invention claimed is:

1. An upper slewing body comprising:
a slewing frame including a first side plate and a second side plate that are opposed to each other in a lateral direction;
an engine deck disposed on a laterally outer side of the slewing frame and fixed to the slewing frame;
a cab deck disposed on a front side of the engine deck with a gap between the cab deck and the engine deck; and
a deck supporting member connected to the second side plate and the cab deck, wherein:
the slewing frame includes a side-plate supporting member connected to the second side plate; and,
when viewed along an up-and-down direction, a connection portion of the side-plate supporting member to be connected to the second side plate, is opposed to, in the lateral direction via the second side plate, a connection portion of the deck supporting member to be connected to the second side plate.

2. The upper slewing body according to claim 1, wherein at least a part of the side-plate supporting member is a front plate connected to the first side plate and the second side plate.

3. The upper slewing body according to claim 2, wherein: the cab deck includes
a frame part to which the deck supporting member is fixed, and
a cab deck reinforcement portion fixed to the frame part; and
the deck supporting member is disposed so as to overlap the cab deck reinforcement portion when viewed along the lateral direction.

4. The upper stewing body according to claim 1, wherein: the stewing frame further includes a bottom plate extending in a front-and-rear direction:
the second side plate extends to an upper side beyond the bottom plate; and
the side-plate supporting member is connected to the second side plate and the bottom plate.

5. The upper stewing body of a construction machine according to claim 4, wherein:
the deck supporting member is constituted by a plurality of unit deck supporting members;
the deck supporting member includes a first deck supporting member that is disposed in a most rear side among the plurality of unit deck supporting members and connected to a rear-side part of the cab deck, and, when viewed along the up-and-down direction, a connection portion of the side-plate supporting member to be connected to the second side plate is opposed to, in the lateral direction via the second side plate, a connection portion of the first deck supporting member to be connected to the second side plate.

6. The upper slewing body according to claim 5, wherein:

a front-side end of the connection portion of the side-plate supporting member to be connected to the second side plate is located on a front side of a rear-side end of the connection portion of the first deck supporting member to be connected to the second side plate; and a rear-side end of the connection portion of the side-plate supporting member to be connected to the second side plate is located on a rear side of a front-side end of the connection portion of the first deck supporting member to be connected to the second side plate.

7. The upper slewing body according to claim 6, wherein, when viewed along the up-and-down direction, a central axis passing through a center, with respect to the front-and-rear direction, of the first deck supporting member overlaps a central axis passing through a center, with respect to the front-and-rear direction, of the side-plate supporting member.

8. The upper slewing body according to claim 5, wherein:

a lower-side end of the connection portion of the side-plate supporting member to be connected to the second side plate is located on a lower side of an upper-side end of the connection portion of the first deck supporting member to be connected to the second side plate; and an upper-side end of the connection portion of the side-plate supporting member to be connected to the second side plate is located on an upper side of a lower-side end of the connection portion of the first deck supporting member to be connected to the second side plate.

9. The upper slewing body according to claim 5, wherein:

the deck supporting member further includes a second deck supporting member that is disposed on the front side of the first deck supporting member; and the side-plate supporting member includes a first side-plate supporting member that is opposed to, in the lateral direction via the second side plate when viewed along the up-and-down direction, the connection portion of the first deck supporting member to be connected to the second side plate, and a second side-plate supporting member that is disposed on the front side of the first side-plate supporting member and opposed to, in the lateral direction via the second side plate when viewed along the up-and-down direction, the connection portion of the second deck supporting member to be connected to the second side plate.

* * * * *